US012695939B2

(12) United States Patent (10) Patent No.: US 12,695,939 B2
Wahlquist-Ortiz et al. (45) **Date of Patent: \*Jul. 28, 2026**

(54) SYSTEMS AND METHODS FOR AUTOMATICALLY GENERATING SCORING SCENARIOS WITH VIDEO OF EVENT

(71) Applicant: Adeia Guides Inc., San Jose, CA (US)

(72) Inventors: Ida Wahlquist-Ortiz, Mountain View, CA (US); Richard Daniel Lee, San Francisco, CA (US)

(73) Assignee: Adeia Guides Inc., San Jose, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 18/665,982

(22) Filed: May 16, 2024

(65) Prior Publication Data

US 2024/0305855 A1 Sep. 12, 2024

Related U.S. Application Data

(63) Continuation of application No. 18/208,457, filed on Jun. 12, 2023, now Pat. No. 12,015,820, which is a continuation of application No. 17/484,388, filed on Sep. 24, 2021, now Pat. No. 11,716,500, which is a continuation of application No. 16/673,770, filed on Nov. 4, 2019, now Pat. No. 11,159,841, which is a continuation of application No. 16/017,532, filed on Jun. 25, 2018, now Pat. No. 10,506,280, which is a continuation of application No. 16/016,084, filed on Jun. 22, 2018, now Pat. No. 10,491,943.

(51) Int. Cl.
*H04N 21/431* (2011.01)
*A63F 13/828* (2014.01)

*H04N 21/2187* (2011.01)
*H04N 21/235* (2011.01)

(52) U.S. Cl.
CPC ....... *H04N 21/4316* (2013.01); *A63F 13/828* (2014.09); *H04N 21/2187* (2013.01); *H04N 21/2353* (2013.01)

(58) Field of Classification Search
CPC ........... H04N 21/4316; H04N 21/2187; H04N 21/2353; A63F 13/828; A63F 13/30; A63F 13/46
See application file for complete search history.

(56) References Cited

U.S. PATENT DOCUMENTS 6,229,550 B1 5/2001 Gloudemans et al.
6,239,794 B1 5/2001 Yuen et al.
(Continued)

*Primary Examiner* — Kunal Langhnoja
(74) *Attorney, Agent, or Firm* — HG LAW LLP

(57) ABSTRACT

Methods and systems are disclosed herein for automatically indicating, during display of video of an event, actions in event that could satisfy side-game scoring scenarios. This may be accomplished by a media application that generates a live video of an event and retrieves data relating to a current status of a side-game in which a user is participating. The media application determines that a next play of the event could affect an outcome of the side-game and, in response, determines a particular action within the event that could affect the outcome of the side-game. The media application generates for display, within the video, an overlay on top of a playing space of the event, the overlay indicating where the particular action would need to occur to affect the outcome of the side-game.

18 Claims, 13 Drawing Sheets

(56) References Cited

U.S. PATENT DOCUMENTS

| | | | |
|---|---|---|---|
| 6,266,100 B1 | 7/2001 | Gloudemans et al. | |
| 6,564,378 B1 | 5/2003 | Satterfield et al. | |
| 7,116,342 B2 | 10/2006 | Dengler et al. | |
| 7,165,098 B1 | 1/2007 | Boyer et al. | |
| 7,458,093 B2 | 11/2008 | Dukes et al. | |
| 7,548,242 B1 | 6/2009 | Hughes et al. | |
| 7,761,892 B2 | 7/2010 | Ellis et al. | |
| 8,028,315 B1 | 9/2011 | Barber | |
| 8,046,801 B2 | 10/2011 | Ellis et al. | |
| 8,584,174 B1 | 11/2013 | Fyock et al. | |
| 9,138,652 B1 | 9/2015 | Thompson et al. | |
| 9,409,081 B2 | 8/2016 | Jensen et al. | |
| 10,491,943 B1 | 11/2019 | Wahlquist-Ortiz et al. | |
| 11,159,841 B2 | 10/2021 | Wahlquist-Ortiz et al. | |
| 11,716,500 B2 | 8/2023 | Wahlquist-Ortiz et al. | |
| 2002/0174430 A1 | 11/2002 | Ellis et al. | |
| 2004/0070691 A1 | 4/2004 | Kojima et al. | |
| 2005/0251827 A1 | 11/2005 | Ellis et al. | |
| 2007/0146372 A1 | 6/2007 | Gee et al. | |
| 2010/0153885 A1 | 6/2010 | Yates | |
| 2014/0141877 A1 | 5/2014 | Jensen et al. | |
| 2015/0148129 A1 | 5/2015 | Austerlade et al. | |
| 2015/0163562 A1 | 6/2015 | Leventhal et al. | |
| 2015/0375117 A1* | 12/2015 | Thompson | A63F 13/79 |
| | | | 463/9 |
| 2016/0263483 A1* | 9/2016 | Le | A63F 13/828 |
| 2017/0061314 A1* | 3/2017 | Schnurr | H04N 21/25891 |
| 2017/0064240 A1* | 3/2017 | Mangat | G06F 16/9535 |
| 2018/0001204 A1 | 1/2018 | Eisenstein et al. | |
| 2019/0114485 A1 | 4/2019 | Chan et al. | |
| 2022/0014814 A1 | 1/2022 | Wahlquist-Ortiz et al. | |
| 2023/0328309 A1 | 10/2023 | Wahlquist-Ortiz et al. | |

* cited by examiner

Football Scoring Scenarios

| Positions | Scoring Role | Scoring Actions | Points |
|---|---|---|---|
| Quarterback | Passing | Passing per 25 Yards | 1 |
| | | TD Pass | 4 |
| | | 2-Point Conversion | 2 |
| | | Interception Thrown | -2 |
| | | Fumble Lost | -2 |
| Running Back<br>Halfback<br>Fullback | Rushing | Rushing per 10 Yards | 1 |
| | | Touchdown | 6 |
| | | 2-Point Conversion | 2 |
| | | Fumble Lost | -2 |
| Punt Receiver<br>Kick Receiver | Misc. | Kickoff Touchdown | 6 |
| | | Punt Touchdown | 6 |
| | | Fumble Recovered Tb | 6 |
| Placekicker | Kicking | FG 50 + yds | 5 |
| | | FG 40-49 | 4 |
| | | FG 0-39 | 3 |
| | | Point After | 1 |
| | | FG Missed | -1 |
| Tackle<br>Defensive End<br>Linebacker<br>Defensive Back | Defense | Interception | 2 |
| | | Fumble Recovered | 2 |
| | | Sack | 1 |
| | | Safety | 2 |

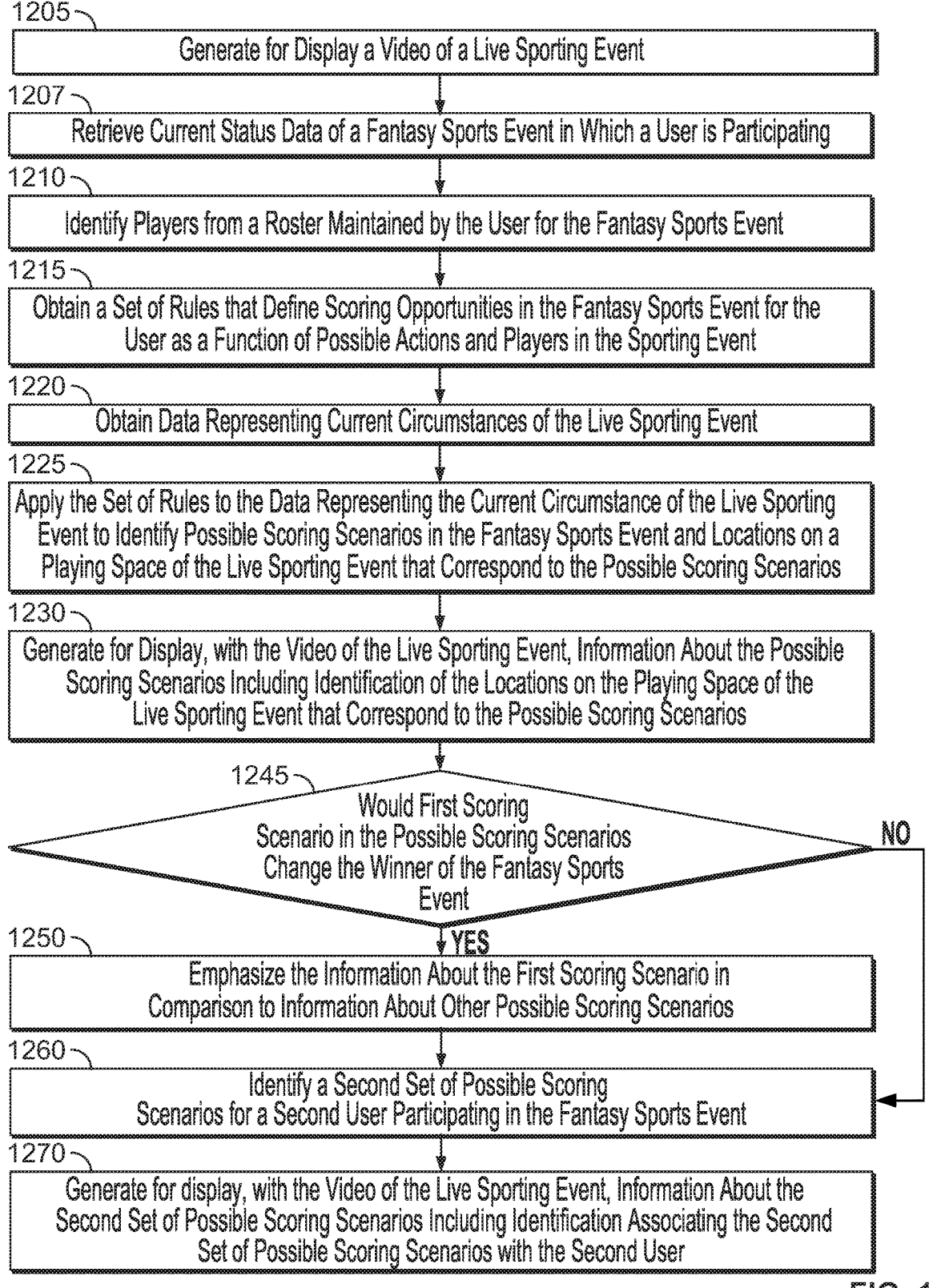

1205 — Generate for Display a Video of a Live Sporting Event

1207 — Retrieve Current Status Data of a Fantasy Sports Event in Which a User is Participating 1210 — Identify Players from a Roster Maintained by the User for the Fantasy Sports Event 1215 — Obtain a Set of Rules that Define Scoring Opportunities in the Fantasy Sports Event for the User as a Function of Possible Actions and Players in the Sporting Event 1220 — Obtain Data Representing Current Circumstances of the Live Sporting Event 1225 — Apply the Set of Rules to the Data Representing the Current Circumstance of the Live Sporting Event to Identify Possible Scoring Scenarios in the Fantasy Sports Event and Locations on a Playing Space of the Live Sporting Event that Correspond to the Possible Scoring Scenarios 1230 — Generate for Display, with the Video of the Live Sporting Event, Information About the Possible Scoring Scenarios Including Identification of the Locations on the Playing Space of the Live Sporting Event that Correspond to the Possible Scoring Scenarios 1245 — Would First Scoring Scenario in the Possible Scoring Scenarios Change the Winner of the Fantasy Sports Event      NO

YES

1250 — Emphasize the Information About the First Scoring Scenario in Comparison to Information About Other Possible Scoring Scenarios 1260 — Identify a Second Set of Possible Scoring Scenarios for a Second User Participating in the Fantasy Sports Event 1270 — Generate for display, with the Video of the Live Sporting Event, Information About the Second Set of Possible Scoring Scenarios Including Identification Associating the Second Set of Possible Scoring Scenarios with the Second User

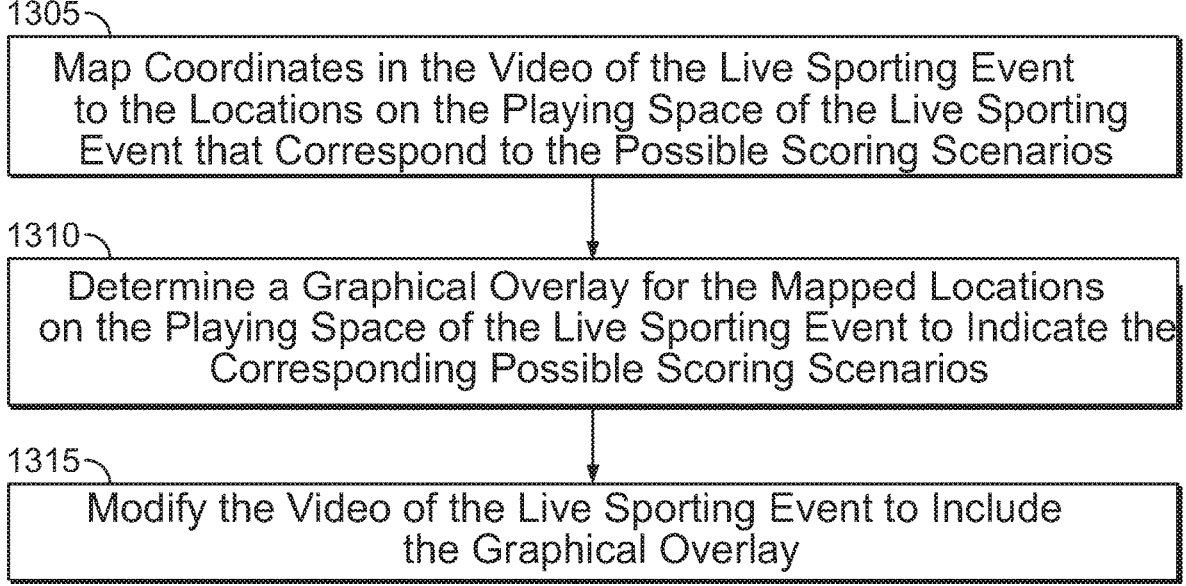

1305 — Map Coordinates in the Video of the Live Sporting Event to the Locations on the Playing Space of the Live Sporting Event that Correspond to the Possible Scoring Scenarios 1310 — Determine a Graphical Overlay for the Mapped Locations on the Playing Space of the Live Sporting Event to Indicate the Corresponding Possible Scoring Scenarios 1315 — Modify the Video of the Live Sporting Event to Include the Graphical Overlay

FIG. 13

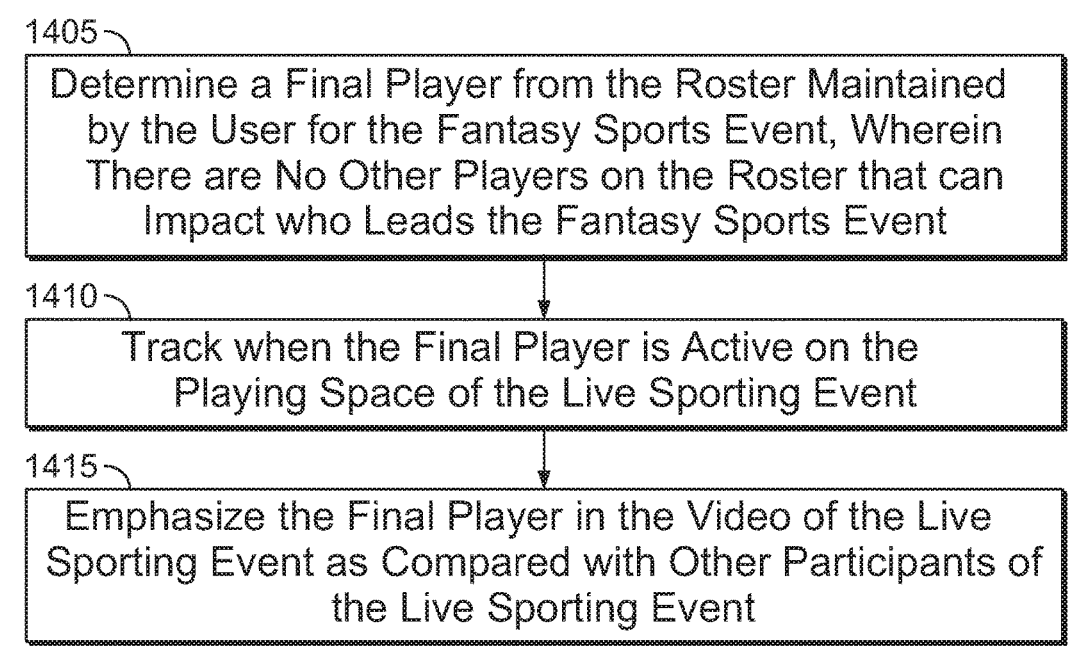

1405 — Determine a Final Player from the Roster Maintained by the User for the Fantasy Sports Event, Wherein There are No Other Players on the Roster that can Impact who Leads the Fantasy Sports Event 1410 — Track when the Final Player is Active on the Playing Space of the Live Sporting Event 1415 — Emphasize the Final Player in the Video of the Live Sporting Event as Compared with Other Participants of the Live Sporting Event

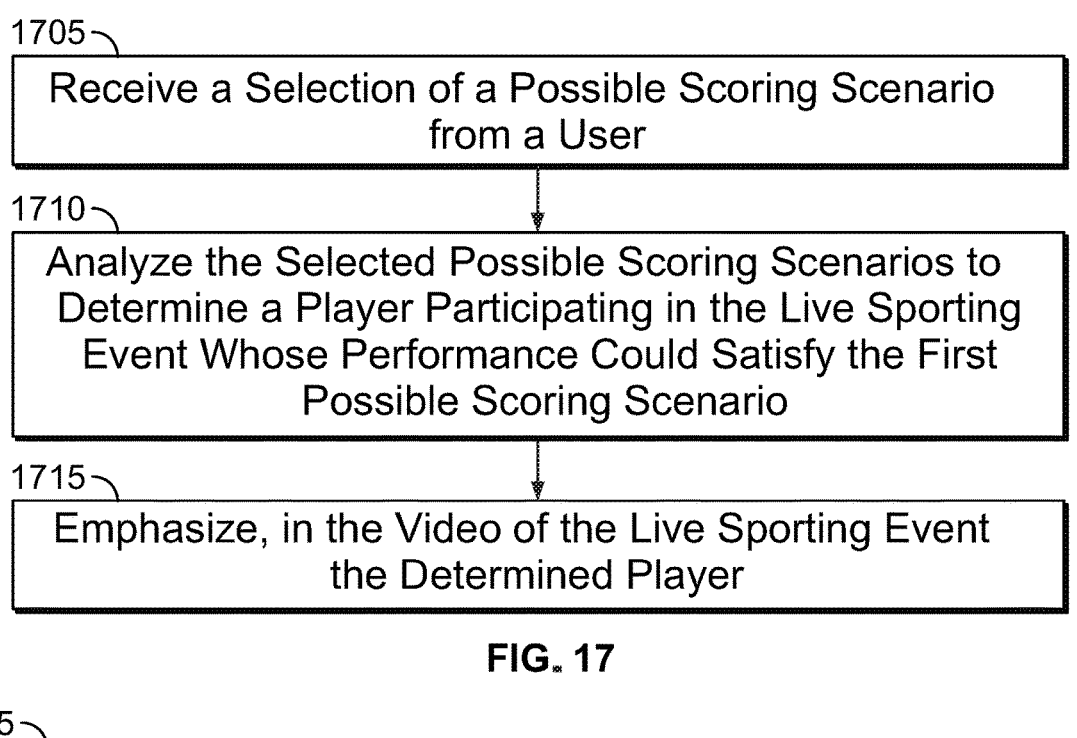

1705

Receive a Selection of a Possible Scoring Scenario
from a User

1710

Analyze the Selected Possible Scoring Scenarios to
Determine a Player Participating in the Live Sporting
Event Whose Performance Could Satisfy the First
Possible Scoring Scenario

1715

Emphasize, in the Video of the Live Sporting Event
the Determined Player

FIG. 17

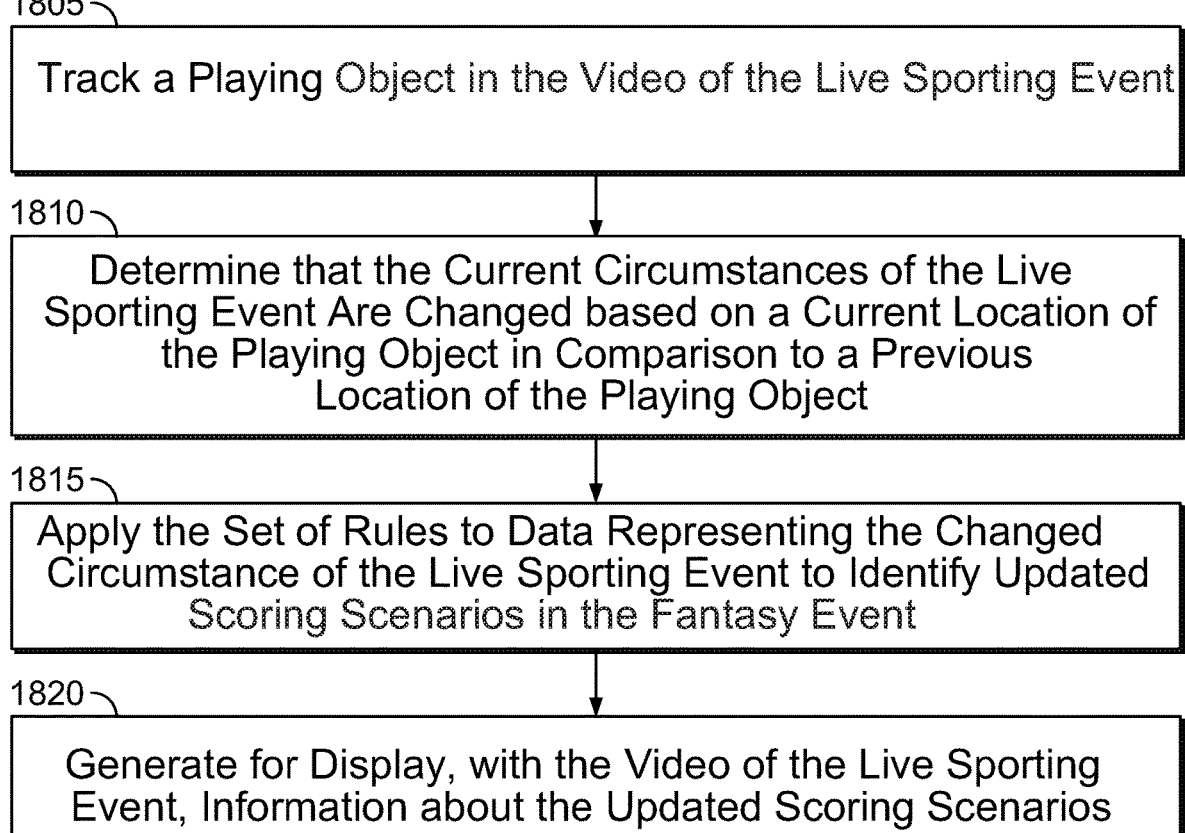

1805

Track a Playing Object in the Video of the Live Sporting Event

1810

Determine that the Current Circumstances of the Live
Sporting Event Are Changed based on a Current Location of
the Playing Object in Comparison to a Previous
Location of the Playing Object

1815

Apply the Set of Rules to Data Representing the Changed
Circumstance of the Live Sporting Event to Identify Updated
Scoring Scenarios in the Fantasy Event

1820

Generate for Display, with the Video of the Live Sporting
Event, Information about the Updated Scoring Scenarios

SYSTEMS AND METHODS FOR AUTOMATICALLY GENERATING SCORING SCENARIOS WITH VIDEO OF EVENT

CROSS-REFERENCE TO RELATED APPLICATION

This application is a continuation of U.S. patent application Ser. No. 18/208,457, filed Jun. 12, 2023, which is a continuation of U.S. patent application Ser. No. 17/484,388 (now U.S. Pat. No. 11,716,500) filed Sep. 24, 2021, which is a continuation of U.S. patent application Ser. No. 16/673, 770 (now U.S. Pat. No. 11,159,841), filed Nov. 4, 2019, which is a continuation of U.S. patent application Ser. No. 16/017,532 (now U.S. Pat. No. 10,506,280), filed Jun. 25, 2018, which is a continuation of U.S. patent application Ser. No. 16/016,084 (now U.S. Pat. No. 10,491,943), filed Jun. 22, 2018. The disclosures of which are hereby incorporated by reference herein in their entireties.

BACKGROUND

Users often watch video of an event and desire supplemental content related to the event. For example, a user may watch a match between electronic sports participants and desire to see statistical information related to the performance of participants in the event. In another example, fantasy sports are common side-games in which individuals participate during amateur and professional sports seasons. Fantasy sports are typically games played by individuals that choose players, i.e., professional athletes, from a sports league to comprise that individual's roster and compete against other users based on the statistics generated by the players during real-life sports contests. For example, an individual may join a service that allows the individual to compete against other players subscribed to the same service. Typically, each user selects a subset of all the players in a corresponding professional league as the user's fantasy roster. Then, in a given time period (e.g., during a week or day), the statistical performance of each player on an individual's roster is used to determine, for example, how many points the individual scored in that week as compared to other players in the fantasy sports league. Typically, one individual is matched up against one or more other participants in a fantasy league for a given time period to determine how well that individual did in the time period. Often times, an individual selects a subset of a roster to be active and benches other players for a given time period (e.g., a week For individuals that participate in a side-game, e.g., fantasy sports contest, the performance of the players on the individual's active roster can be very important to the individual. As side-games have become increasingly popular, users frequently view sports programming in order to assess the play of participants important to a user's side-game, e.g., a fantasy sports roster, as opposed to watching whether or not a particular team wins. Therefore, traditional commentary and added features (e.g., statistical analyses displayed on-screen during a game), which normally concern the event as a whole, are of less interest to users viewing events to assess the outcome of their side-games, e.g., to assess the play of members on a fantasy sports team. Moreover, without commentary or added features addressing particular players, it is often difficult for a user to determine how a member of his fantasy roster can score points for the user's fantasy team and determine whether or not members of his fantasy team can change the outcome of a side-game, e.g., fantasy sports matchup. And tracking the individual's performance may be just as important to the individual, if not more important, than the outcome of the event, e.g., live sporting event between two professional teams or electronic sporting event such as a first-person action tournament of multiplayer online battle arena tournament. In such cases, individuals desire opportunities to keep track of the performance of their roster and especially of the impact of the performance of their active players on the outcome of fantasy sports matchups.

SUMMARY

As the availability of technology continues to increase so does users' access to information at all times. In the space of electronic sports matches and events, e.g., first person action gaming or multiplayer online battle arenas, the action moves quickly and viewer want constant updates on the actions and performance of all user in the event. And as more and more users participate in fantasy sports to supplement their sports viewing, these users frequently consume sports video through a display device and, on a separate device, access information pertaining to their fantasy sports contest. Indeed, conventional presentation of a live sporting event is unable to account for a user's participation in a fantasy sports contest, as video of the live sporting event is not personalized to account for a user's participation in fantasy sports. Thus, users often watch a live sporting event on one device while accessing information pertaining to their fantasy sports participation on a second device. Furthermore, users may not be aware when certain sporting events are in situations with the potential to impact their fantasy sports matchups.

Accordingly, to overcome the problems of distracting user from an event, systems and methods are described herein for a media application that display supplemental information with an event. For example, systems and methods disclosed allows users to watch a live sporting event without requiring user access second devices to check on the status of the fantasy sports events. In some embodiments, systems and methods are described herein for a media application that automatically detects side-game, e.g., fantasy sports, scoring scenarios possible within a live sporting event and present information about those scenarios to a user watching the live sporting event. For example, a scoring scenario is a situation that is possible given the current circumstances of a live sporting event that has the potential to provide a user with fantasy sports points. These systems and methods also allow a user to identify situations in various sporting events with different impacts on the user's fantasy sports matchups. In some embodiments, a media application may generate for display a live video of an event. For example, a user may instruct a media application to generate for display a current matchup between the San Francisco 49ers and the San Diego Chargers playing in the National Football League ("NFL"). The media application may retrieve data relating to a current status, at a current time, of a side-game in which a user is participating, the side-game being based on the performance of participants in the event. For example, the media application may get information about a fantasy sports matchup in which the user is participating such as a weekly fantasy football match against another individual. The media application may also determine, at the current time, that a next play of the event could affect an outcome of the side-game. For example, the media application may determine that the user is within 4 points of winning the fantasy sports matchup. In response to determining that the next play could affect the outcome of the side-game, the media application may determine a particular action within the sporting event that could affect the outcome of the side-game. For example, the media application may determine that the user has a running back from the San Francisco 49ers on the user's active fantasy roster and, based on the current circumstances of the match between the 49ers and the Chargers, the user's running back is in position to score 6 points if the running back achieves a rushing touchdown. In some embodiments, the media application may generate for display, within the video of the event, an overlay on top of a playing space of the event, the overlay indicating where the particular action would need to occur to affect the outcome of the side-game. For example, the media application may display a highlight on the user's running back (e.g., a halo around the running back in red and gold) along with a marker at the end-zone (e.g., a red and gold line on the goal line) along with textual annotation of the possible fantasy sports implications.

In some aspects of the disclosure, systems and methods are described for automatically indicating, during display of video of an event, e.g., a live sporting event, actions in the event that could satisfy side-game, e.g., fantasy sports, scoring scenarios. In some embodiments, a media application generates for display a video of the event. As described above, this could be a current match between the San Francisco 49ers and San Diego Chargers. In some embodiments, the media application may retrieve, from a memory, current status data of a side-game in which a user is participating. For example, the user may be in a fantasy football league and the media application may retrieve the current status of the user's weekly matchup (e.g., the user's active roster, the user's opponent's active roster, the current score for each user in the matchupfantasy matchup, etc.). In this example, the user's weekly matchup is a fantasy sports event in which the user is participating.

In some embodiments, the media application may identify players participating in the event from a roster maintained by the user for the side-game. For example, the media application may identify players from the user's fantasy team roster that play on either the San Francisco 49ers or the San Diego Chargers and that are active on the user's roster. In some embodiments, the media application may obtain a set of rules that define scoring opportunities in the side-game for the user as a function of possible actions and players in the event. For example, the media application may determine that the user has an active running back on his fantasy football roster that plays for the San Francisco 49ers, and the media application may retrieve a rule that indicates that the user has a scoring opportunity if the user's running back rushes for a touchdown (e.g., the user may receive 6 points toward the user's fantasy score for the week if the user's running back rushes for a touchdown).

In some embodiments, the media application may obtain data representing current circumstances of the event. For example, the media application may obtain information specifying the team with current possession of the football, the current line of scrimmage, the current players on the field of play, the amount of time remaining in the live sporting event, the score of the professional teams in the live sporting event, etc. In some embodiments, the media application may apply the set of rules to the data representing the current circumstances of the event to identify possible scoring scenarios in the side-game and locations on a playing space of the event that correspond to the possible scoring scenarios. For example, if the user's active running back is currently on the field of play and the line of scrimmage is on the San Francisco 49ers' 6-yard line, then the set of rules may indicate that the user has a 6-point scoring opportunity.

Depending on the use case for the media application, the playing space of the event may be a physical playing space such as a football field or a virtual playing space such as a virtual environment in an electronic sports game.

In some embodiments, the media application may further determine that, based on the score of side-game matchup, a 6-point scoring opportunity may give the user the lead in the current side-game matchup. In some embodiments, the media application may generate for display, with the video of the event, information about the possible scoring scenarios including identification of the locations on the playing space of the event that correspond to the possible scoring scenarios. For example, the media application may present a textual list of possible scoring opportunities (e.g., rushing touchdown scores 6 points) including information indicating that the scoring opportunity occurs at the San Francisco 49ers' goal line.

The rules-based approach to identifying scoring opportunities for a user's side-game matchup allows the systems and methods described herein to overcome several problems. For example, the rules-based approach provides a system that is agile enough to cover multiple scoring systems that contain different rules. In fact, a media application may retrieve or be provided with rules stored by a service or defined by a user that can be used by the media application to identify scoring opportunities without hard-coding the rules. Furthermore, the systems and methods can be applied to a litany of events and sport by changing the rules that define the scoring system of that event or sport. Additionally, the media application, using a rules-based approach to identify scoring opportunities, solves yet another problem of keeping users from being distracted by other devices by providing individualized information to viewers that relates to their interest and augments the viewing of live sporting event.

In some embodiments, the media application generates for display, with the video of the event, information about the possible scoring scenarios comprises using the following techniques. The media application may map coordinates in the video of the event to the locations on the playing space of the event that correspond to the possible scoring scenarios. For example, the media application may identify the location of the San Francisco 49ers' goal line in the video of the live sporting event (e.g., the xy-coordinates of the goal line).

In some embodiments, the media application may correlate coordinates in a three-dimensional model of the playing space of the event with the video of the event to determine coordinates in the video of the playing space that correlate with locations of interest. In some embodiments, the media application may generate a graphical overlay for the mapped locations on the playing space of the event to indicate the corresponding possible scoring scenarios. For example, the media application may generate a red and gold line over the goal line and a red and gold halo around the user's running back on the playing surface. In some embodiments, the media application modifies the video of the event to include the graphical overlay. For example, the media application may overlay the graphical information and textual information over the video of the event, e.g., sporting match.

In some embodiments, the media application may further determine whether a first scoring scenario in the possible scoring scenarios would change the winner of the side-game matchup. For example, the user may have a 3-point scoring opportunity and a 6-point scoring opportunity at the same time the user may be within 4 points of fantasy scoring. Thus, the 6-point scoring opportunity could change the winner of the fantasy sports event. In response to determining that the first scoring scenario could change who leads the side-game matchup, the media application may emphasize the information about the first scoring scenario in comparison to information about other possible scoring scenarios. For example, the media application may generate information about the 6-point scoring opportunity in a different color, thicker text, or with special markings to emphasize the fact that the 6-point scoring opportunity could change the winner of the fantasy sports matchup.

In some embodiments, the media application may further determine a final player from the roster maintained by the user for the side-game matchup. In other words, the media application may determine there are no other players on the roster that can impact who leads the side-game. For example, the media application may determine that the user's running back is the last active player from the user's fantasy sports roster and that the user has no other players available from his active fantasy sports roster that can score points in the user's fantasy sports matchup. In some embodiments, the media application tracks when the final player is active on the playing space of the event. For example, the media application may employ facial recognition or optical character recognition to identity a name or number on a player's jersey. In another example, the media application may receive a list of players on the play surface of an event from a data service. In some embodiments, the media application may emphasize the final player in the video of the event as compared with other participants of the event. For example, the media application may include a special icon indicating the importance of the athlete to the user's fantasy sports matchup.

In some embodiments, the media application may identify a second set of possible scoring scenarios for a second user participating in the side-game matchup. For example, the user may be watching the live sporting event with the user's opponent in the fantasy sports matchup and the media application may use techniques similar to those described above to identify scoring opportunities for the user's opponent.

In some embodiments, the media application may generate for display, with the video of the event, information about the second set of possible scoring scenarios including identification associating the second set of possible scoring scenarios with the second user. In some embodiments, the media application may generate information about the second set of possible scoring scenarios on a secondary display device used by the second user. For example, the user's opponent may have access to a second display such a user tablet, mobile device, virtual reality goggles, or other personal display device.

In some embodiments, the media application may generate for display, with the video of the event, information about the possible scoring scenarios using the following techniques. The media application may establish communication with a secondary display device. For example, the media application may communicate with a user tablet, mobile device, virtual reality goggles, or other personal display device. In some embodiments, the media application may obtain, from the secondary display device, a relative position of the secondary display device in comparison to a primary display device that is displaying the video of the event. For example, the media application may receive an indication that the secondary display device is to the left of the primary display device. In some embodiments, the media application provides the secondary display device with the information about the possible scoring scenarios for display on the secondary display device. In some embodiments, the media application uses the relative position of the secondary display device to determine which information to generate for display on the secondary display.

In some embodiments, the media application analyzes a first of the possible scoring scenarios to determine a player participating in the event whose performance could satisfy the first possible scoring scenario. For example, the media application may determine that a rushing touchdown scoring scenario can be satisfied by "J. Mckinnon," a running back on the San Francisco 49ers and also on the user's active fantasy roster. The media application may then retrieve statistics of the determined player relevant to the first possible scoring scenario. For example, the media application may determine that J. Mckinnon on average rushes for 2.3 touchdowns per game and has already rushed for 2 touchdowns and therefore there is a low probability that J. Mckinnon will rush for a third touchdown. In some embodiments, the media application may utilize additional statistics, such as the yards per carry for the career, yards per carry against the particular opponent, yards per carry in the game, etc., along with information about the current situation of the game, such as the current line of scrimmage. In some embodiments, the media application may generate for display, with the information about the possible scoring scenarios, information about the statistics of the determined player.

In some embodiments, the media application receives a selection of a possible scoring scenario from a user. For example, the media application may receive a gesture selection indicating the user selected "rushing touchdown" from a list of possible scoring scenarios. In some embodiments, the media application analyzes the selected possible scoring scenarios to determine a player participating in the event whose performance could satisfy the first possible scoring scenario. For example, if the selected scoring scenario is a rushing touchdown, then the media application may determine that J. Mckinnon from the San Francisco 49ers can satisfy the selected scenario. In some embodiments, the media application may emphasize, in the video of the event, the determined player.

In some embodiments, the media application may track a playing object in the video of the event. For example, an image recognition system in the media application may use the size, shape, or color of different playing objects such as a football or other object. The media application may determine that the current circumstances of the event are changed based on a current location of the playing object in comparison to a previous location of the playing object. For example, if the line of scrimmage was originally determined to be at the San Francisco 49ers' 45-yard line and the ball is tracked from the 45-yard line to the 30-yard line, then the media application may determine the circumstances of the event have changed. In some embodiments, the media application may apply the set of rules to data representing the changed circumstance of the event to identify updated scoring scenarios in the side-game matchup and generate for display, with the video of the event, information about the updated scoring scenarios.

In some embodiments, the media application may track a player in the event during an active portion of the event, e.g., during a football play. As the action progresses, the media application annotates the video of the event with information regarding the points the user is accumulating during the action of the event, e.g., in realtime. For example, if the user has the 49ers' running back on his fantasy roster and the running back is running the ball during a play, then the media application may annotate the display with a notation of the points the user is gaining based on the distance the running back carries the ball. The media application may display the points in any increment of accumulation, e.g., in 0.1-point increments or 1-point increments. This may appear as a score total in the corner of a display or as an annotation in a cloud or box near the player of interest. In some embodiments, the media application may display the amount of points needed for a user to win his fantasy sports matchup and subtract points from the needed amount as the user scores points in a given play. In some embodiments, the user's total score is updated as the user scores points during action.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 depicts an illustrative set of scoring scenarios for a fantasy football scoring system in accordance with some embodiments of the disclosure;

FIG. 12 is a flowchart of illustrative steps for generating a display of information about fantasy sports scoring opportunities in accordance with some embodiments of the disclosure;

FIG. 13 is a flowchart of illustrative steps for mapping information about scoring opportunities onto video of a live sporting event in accordance with some embodiments of the disclosure;

FIG. 14 is a flowchart of illustrative steps for emphasizing a player on a user's fantasy sports roster in video of a live sporting event in accordance with some embodiments of the disclosure;

FIG. 17 is a flowchart of illustrative steps for emphasizing a selected player in a video of a live sporting event in accordance with some embodiments of the disclosure; and FIG. 18 is a flowchart of illustrative steps for updating the scoring opportunities based on changed circumstances in a live sporting event in accordance with some embodiments of the disclosure.

DETAILED DESCRIPTION

Figure 1:
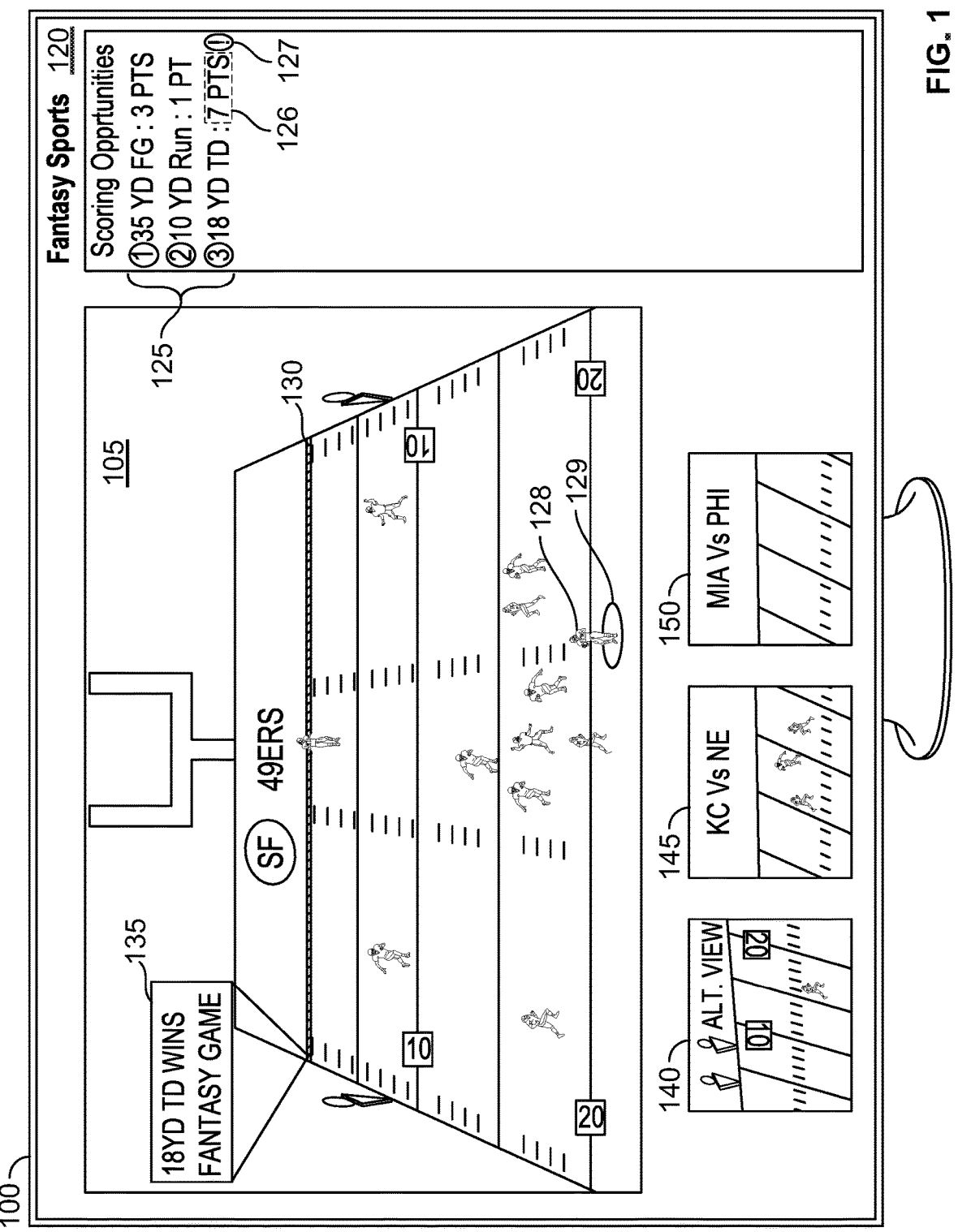
FIG. 1 depicts an illustrative embodiment of a display of fantasy sports scoring opportunities presented with video of a live sporting event in accordance with some embodiments of the disclosure.

FIG. 1 depicts an illustrative embodiment of a display of fantasy sports scoring opportunities presented with video of a live sporting event in accordance with some embodiments of the disclosure. In FIG. 1, a user equipment 100 (i.e., a television) implements a media application using control circuitry. The functionality of user equipment, control circuitry, and the media application is described in further detail with respect to FIGS. 4-7.

In FIG. 1, the media application is generating video 105 of a live sporting event. For example, video 105 may be of a National Football League ("NFL") game between the San Francisco 49ers ("49ers") and the San Diego Chargers. Along with the video 105 of the live sporting event, the media application may generate an informational display 120 that includes information about a fantasy sports contest in which a user (i.e., a viewer of the live sporting event) is participating.

For demonstrative purposes, the example of FIG. 1 depicts a football game between plays. The football (i.e., the playing object) is located on the 49ers' 18-yard line and the 49ers are depicted as having possession of the football (i.e., on offense). While the descriptions below are made using the example of a live sporting event and a fantasy sports event, a person of skill in the art would apply the techniques equally to other events and other side-games.

The media application may retrieve data relating to a current status, at a current time, of a side-game in which a user is participating, the side-game being based on the sporting event. For example, the media application may retrieve information about a fantasy sports matchup in which the user is participating, such as a weekly fantasy football match against another individual. In some embodiments, the media application may access information from a remote server by way of an application programming interface to retrieve information about live sporting events and the user's side-game. In some embodiments, the information about live sporting events and the user's side-game may be transmitted with the sports programming (e.g., from media content source 716 (FIG. 7)) as metadata for the media application. In some embodiments, as described herein, the media application may analyze video of live sporting events to determine information about the circumstances of the live sporting events such as the identities of players on the field, the location of the playing object, the team with possession of the playing object, etc.

The media application may also determine, at the current time, that a next play of the sporting event could affect an outcome of the side-game. For example, the media application may determine that the user is within 4 points of winning the fantasy sports matchup. In response to determining that the next play could affect the outcome of the side-game, the media application may determine a particular action within the sporting event that could affect the outcome of the side-game. In some embodiments, the media application may generate for display, within the live video 105, an overlay on top of a playing space of the sporting event, the overlay indicating where the particular action would need to occur to affect the outcome of the side-game. For example, the media application may display a highlight 129 on the user's running back 128 (e.g., a halo around the running back in red and gold) along with a marker 130 at the end-zone (e.g., a red and gold line on the goal line) and a textual annotation 135 of the possible fantasy sports implications.

In some embodiments, the media application may present a list of scoring opportunities 125 to the user. For example, if the user has a fantasy sports roster consisting of different players from different teams, then the user may have scoring opportunities in the live sporting event based on having one or more players from the San Francisco 49ers or the San Diego Chargers. In the example of FIG. 1, the identified scoring opportunities are listed as a 35-yard field goal, a 10-yard run, and an 18-yard touchdown run which yield 3 points, 1 point, and 7 points respectively for the user in his fantasy sports matchup. In some embodiments, the media application determines the scoring opportunities based on the circumstances of the live sporting event (e.g., the 49ers being in possession of the football at the 18-yard line) and the user's fantasy sports roster, which in this example includes at least the 49ers' placekicker and running back.

In some embodiments, the media application may be in communication with a service that maintains information about the user's fantasy sports league. For example, the media application may be in communication with a server maintained by a service such as Draftkings, Yahoo!, ESPN, or Fan Duel. The media application may access the information using a service API, remote procedure call, or by, for example, scraping data. The media application may obtain a username, password, or other login credentials unique to the user to allow the media application to retrieve information particularized to the user. In some embodiments, the media application may obtain a username or team name that allows the media application to identify the user's roster information from among a league of users. In some embodiments, the information also contains the performance of the user's fantasy team during a given period of time, e.g., during a week, and/or includes information about the real life sporting events that indicates the points in the fantasy sports league.

In some embodiments, the media application may retrieve, from a memory, current status data of a fantasy sports event in which a user is participating. For example, the user may be in a fantasy football league, and the media application may retrieve the current status of the user's weekly matchup (e.g., the user's active roster, the user's opponent's active roster, the current score for each user in the matchupfantasy matchup, etc.). In some embodiments, the media application may identify players participating in the live sporting event that are from a roster maintained by the user for the fantasy sports event. For example, the media application may identify players from the user's fantasy team roster that play on either the San Francisco 49ers or the San Diego Chargers and that are active on the user's roster.

In some embodiments, the media application may obtain a set of rules that define scoring opportunities in the fantasy sports event for the user as a function of possible actions and players in the sporting event. For example, the media application may determine that the user has an active running back on his fantasy football roster that plays for the San Francisco 49ers, and the media application may retrieve a rule that indicates that the user has a scoring opportunity if the user's running back rushes for a touchdown (e.g., the user may receive 6 points toward the user's fantasy score for the week if the user's running back rushes for a touchdown).

In some embodiments, the media application may obtain data representing current circumstances of the live sporting event. For example, the media application may obtain information specifying the team with current possession of the football, the current line of scrimmage, the current players on the field of play, the amount of time remaining in the live sporting event, the score of the professional teams in the live sporting event, etc.

In some embodiments, the media application may apply the set of rules to the data representing the current circumstances of the live sporting event to identify possible scoring scenarios in the fantasy sports event and locations on a playing space of the live sporting event that correspond to the possible scoring scenarios. For example, if the user's active running back is currently on the field of play and the line of scrimmage is on the San Francisco 49ers' 6-yard line, then the set of rules may indicate that the user has a 6-point scoring opportunity. In some embodiments, the media application may further determine that, based on the score of the fantasy sports matchup, a 6-point scoring opportunity may give the user the lead in the current fantasy sports matchup.

In some embodiments, the media application may generate for display, with the video of the live sporting event, information about the possible scoring scenarios (e.g., a list of scoring opportunities 125). In some embodiments, the media application may include identification of the locations on the playing space of the live sporting event that correspond to the possible scoring scenarios. For example, the media application may present a textual list of possible scoring opportunities (e.g., rushing touchdown scores 6 points), including information indicating the scoring opportunity occurs at the San Francisco 49ers' goal line.

In some embodiments, the media application may generate for display, within the live video, an overlay on top of a playing space of the sporting event, the overlay indicating where the particular action would need to occur to affect the outcome of the side-game. For example, the media application may display a highlight on the user's running back (e.g., a halo around the running back in red and gold), along with a marker at the end-zone (e.g., a red and gold line on the goal line), along with textual annotation of the possible fantasy sports implications.

In some embodiments, the media application may emphasize a scoring opportunity from the list of scoring opportunities 125 as being particularly impactful on the user's fantasy sports matchup. For example, if the user is down by 4 points in his fantasy matchup, then a scoring opportunity worth more than 4 points would swing outcome of the user's matchup from a loss for the user to a win for the user. FIG. 1 further depicts such a scenario with an optional emphasis of the 18-yard rushing touchdown scoring opportunity with a highlighting box 126 and emphasis icon 127 (e.g., an exclamation mark accompanying the identification of the scoring opportunity). In some embodiments, the media application may employ one of the emphasizing markers without displaying the other. Still other types of emphasis may be used by the media application to denote particular scoring opportunities, e.g., underline, specific colors, bolded text, highlighting, other icons, flashing text, etc.

In some embodiments, the media application may identify players from a user's fantasy sports roster that are on the field of play. For example, methods and systems for visually distinguishing players in video of a sporting event are described in greater detail in Jensen et al. U.S. Pat. No. 9,409,081, issued Aug. 9, 2016, which is hereby incorporated by reference herein in its entirety. In video 105, the 49ers' running back 128 ("J. Mckinnon," jersey number 28) is depicted with a halo 129. As noted above, the media application has identified two scoring opportunities for the user based on the user having the 49ers' running back 128 on his fantasy sports roster.

In some embodiments, the media application may further identify scoring opportunities based on the identification of players on the active playing surface of a sporting event. In such a case, the media application may identify the 10-yard run and 18-yard touchdown run as scoring opportunities based on the 49ers' running back 128 being on the active field as the running back is associated with those opportunities, and at the same time the media application may not identify the 35-yard field goal as a scoring opportunity because the user's player associated with that opportunity, the 49ers' placekicker, is not currently on the field of play.

In some embodiments, the media application may also present guidance opportunities to the user. For example, the media application may present other views of the live sporting event or other sporting events of interest. This is shown in FIG. 1 where the media application is showing an alternative view of the 49ers' football game as a navigation option 140. In FIG. 1, the media application is also showing other NFL football games as navigation options 145 and 150. For example, the media application may analyze the user's fantasy roster to determine which players on the user's fantasy roster are on teams with an active football game and present those games as viewing options. In some embodiments, the media application may determine that certain players on the user's fantasy roster have scoring opportunities with more significant impact on the user's fantasy matchup (i.e., higher point potential) and emphasize the navigation option for the corresponding matchup with, for example, highlighting or textual emphasis.

In some embodiments, the media application may automatically switch the display of the video 105 of the live sporting event to a second live sporting event (e.g., the game depicted in option 145) based on the potential impact of the sporting events on the user's fantasy sports matchup. For example, the media application may determine the user has a scoring opportunity worth 9 points in a matchup between the Kansas City Chiefs and New England Patriots (depicted as option 145 in FIG. 1) based on the user's fantasy roster and the circumstances of the game between the Chiefs and the Patriots. In response to determining the Chiefs versus Patriots game is potentially more impactful to the user's fantasy matchup, the media application may automatically switch video of the Chiefs' game into a primary position and place video 105 of the 49ers' game into a secondary position.

In some embodiments, the media application may identify the list of scoring opportunities 125 based on more than one sporting event based on the user's roster of players and the circumstances of multiple sporting events. The media application may, for example, allow the user to select different scoring opportunities from the list of scoring opportunities 125. Upon selection, the media application may determine the player associated with the scoring opportunity and also the sporting event associated with the scoring opportunity. Using that information, the media application may generate for display video of the identified player or the identified sporting event if such a video is available for display. For example, if the user has a scoring opportunity in the Chiefs' game, depicted as navigation option 145, and the user selects that scoring opportunity from list 125 (e.g., using a remote control, touch input, voice control, or other input) then the media application may place video of the Chiefs' game in place of the video 105 of the 49ers' game. Therefore, the techniques described herein provide unique opportunities to allow a user to keep track of the events in a live sporting event, or multiple live sporting events, that impact the user's fantasy sports matchups.

In some embodiments, the media application may further determine a final player from the roster maintained by the user for the fantasy sports event. In other words, there are no other players on the roster that can impact who leads the fantasy sports event. For example, the media application may determine that the user's running back is the last active player from the user's fantasy sports roster and that the user has no other players available from his active fantasy sports roster that can score points in the user's fantasy sports matchup. In some embodiments, the media application tracks when the final player is active on the playing space of the live sporting event. For example, the media application may employ facial recognition or optical character recognition to identity a name or number on a player's jersey. In another example, the media application may receive a list of players on the play surface of a sporting event from a data service. In some embodiments, the media application may emphasize the final player in the video of the live sporting event as compared with other participants of the live sporting event. For example, the media application may include a special icon indicating the importance of the athlete to the user's fantasy sports matchup. For example, the media application may determine that the 49ers' running back 128 is the last active player from the user's fantasy sports lineup and may emphasize that player in accordance with the techniques described above.

In some embodiments, the media application analyzes a first of the possible scoring scenarios to determine a player participating in the live sporting event whose performance could satisfy the first possible scoring scenario. For example, the media application may determine that a rushing touchdown scoring scenario can be satisfied by "J. Mckinnon," a running back on the San Francisco 49ers and also on the user's active fantasy roster. The media application may then retrieve statistics of the determined player relevant to the first possible scoring scenario. For example, the media application may determine that J. Mckinnon on average rushes for 2.3 touchdowns per game and has already rushed for 2 touchdowns and therefore there is a low probability that J. Mckinnon will rush for a third touchdown. In some embodiments, the media application may utilize additional statistics such as the yards per carry for the career, yards per carry against the particular opponent, yards per carry in the game, etc., along with information about the current situation of the game such as the current line of scrimmage. In some embodiments, the media application may generate for display, with the information about the possible scoring scenarios, information about the statistics of the determined player.

In some embodiments, the media application receives a selection of a possible scoring scenario from a user. For example, the media application may receive a gesture selection indicating the user selected rushing touchdown from a list of possible scoring scenarios 125. In some embodiments, the media application analyzes the selected possible scoring scenarios to determine a player participating in the live sporting event whose performance could satisfy the first possible scoring scenario. For example, if the selected scoring scenario is a rushing touchdown, then the media application may determine that J. Mckinnon from the San Francisco 49ers can satisfy the selected scenario. The media application may emphasize, in the video 105 of the live sporting event, the determined player using, for example, halo 129.

In some embodiments, the media application receives video of live sporting events to be displayed on a user device (also known as user equipment) and processes video of the live sporting events using an object recognition module to determine characteristics of the event (e.g., the identities of players on the field of play, the location of an object of play, etc.). As used herein, an "object recognition module" is any device or application that may be associated with, incorporated into, or accessed by the media application or the user equipment upon which the media application is implemented and tasked with finding a given object and/or determining characteristics about the object in an image or video.

The object recognition module may use edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the objects and/or characteristics in media assets. For example, the media application may receive sports programming in the form of a video. The video may include a series of frames. For each frame of the video, the media application may use an object recognition module to determine the characteristics associated with each player currently appearing in the sports programming.

In addition, the media application may use multiple types of optical character recognition and/or fuzzy logic, for example, when comparing multiple data fields (e.g., as contained in data structures described below). For example, the particular data field may be a textual data field. Using fuzzy logic, the system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, additional information, and/or any other data required for the function of the embodiments described herein. Furthermore, the data fields could contain values (e.g., the data fields could be expressed in binary or any other suitable code or programming language).

As used herein, a "characteristic" of a player refers to any marking, tag, or other signal used to identify a player, including the position of the player, to people or media systems. For example, characteristics of a player may be physical markings that appear on an actual player as the player participates in a televised sporting event (e.g., a jersey number, team name, a name appearing on the uniform, etc.). In some embodiments, the characteristics may also include tags transmitted with the sports programming (e.g., from media content source 716 (FIG. 7)) as metadata, which indicates to the media application particular traits and/or attributes (including, but not limited to, the name of a player and/or the position of the player on currently displayed sports programming). In some embodiments, the characteristics of players currently appearing in sports programming may be transmitted in the form of media data. For example, the characteristics determined by an object recognition module incorporated into a media application may be transmitted to a remote server for processing. Additionally or alternatively, media data describing the characteristics may be transmitted from a remote server to a media application.

As used herein, "visually distinguishing" a player may include any indication in the media asset that alerts a user to the presence of the player in the sports programming. In some embodiments, visually distinguishing a player may include highlighting, boxing, bolding, enlarging, changing the color, or otherwise graphically altering the player as displayed in the sports programming. In addition, multimedia indications may also be used. For example, the media application may use audio tones and/or audio descriptions (e.g., a verbal announcement) to indicate the presence of the player in the sports programming. In some embodiments, the media application may additionally or alternatively visually distinguish players based on user inputs (e.g., instructions to visually distinguish or not visually distinguish the players currently appearing or players that will appear in the sports programming).

Figure 2:
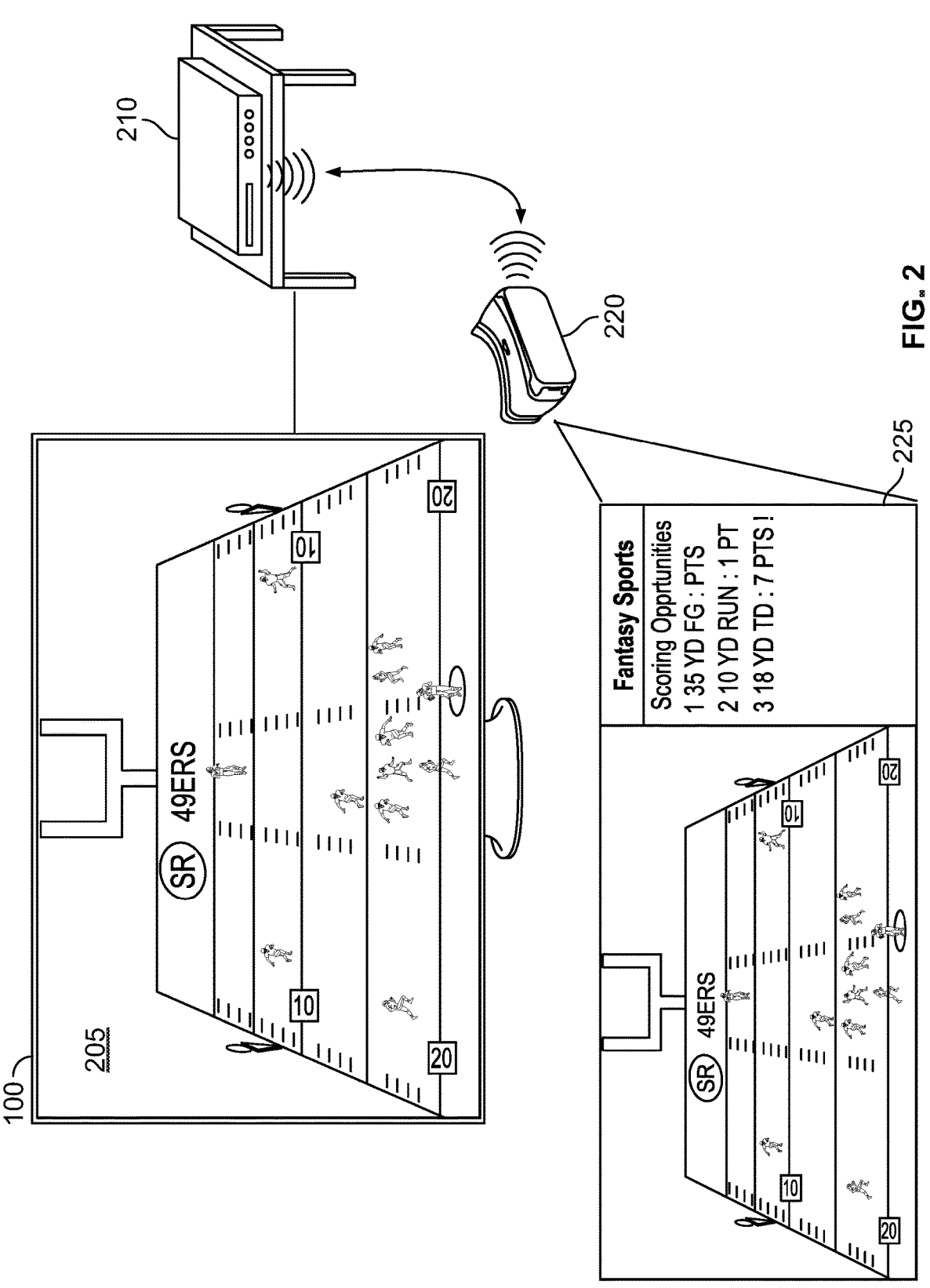
FIG. 2 depicts an illustrative embodiment of a display of fantasy sports scoring opportunities on a secondary display while video of a live sporting event is displayed on a primary display in accordance with some embodiments of the disclosure.

FIG. 2 depicts an illustrative embodiment of a display of fantasy sports scoring opportunities on a secondary display 220 while video 205 of a live sporting event is displayed on a primary display 200 in accordance with some embodiments of the disclosure. Continuing with the example described with reference to FIG. 1, FIG. 2 depicts the video 205 of the live sporting event between the 49ers and the Chargers as being displayed on user equipment 200. In FIG. 2, the display of the video 205 is generated on user equipment 200 without fantasy sports information. In some embodiments, user equipment 200 communicates with user equipment 210 (e.g., a set-top box). In FIG. 2, a secondary display 220 (e.g., augmented reality or virtual reality goggles) also communicates with user equipment 210. In FIG. 2, the secondary display 220 presents the user with fantasy sports information such as the fantasy sports information which corresponds with the fantasy sports information 120 from FIG. 2.

In some embodiments, the media application may identify a second set of possible scoring scenarios for a second user participating in the fantasy sports event. For example, the user may be watching the live sporting event with the user's opponent in the fantasy sports matchup, and the media application may use techniques similar to those described above to identify scoring opportunities for the user's opponent.

In some embodiments, the media application may generate for display, with the video 205 of the live sporting event, information about the second set of possible scoring scenarios including identification associating the second set of possible scoring scenarios with the second user. In some embodiments, the media application may generate information about the second set of possible scoring scenarios on a secondary display device 220 used by the second user. For example, the user's opponent may have access to a second display such a user tablet, mobile device, virtual reality goggles, or other personal display device.

In some embodiments, the media application may generate for display, with the video 205 of the live sporting event, information about the possible scoring scenarios using the following techniques. The media application may establish communication with a secondary display device 220. For example, the media application may communicate with a user tablet, mobile device, virtual reality goggles, or other personal display device. In some embodiments, the media application may obtain, from the secondary display device 220, a relative position of the secondary display device 220 in comparison to a primary display device 200 displaying the video 205 of the live sporting event. For example, the media application may receive an indication that the secondary display device 220 is to the left of the primary display device 200. In some embodiments, the media application provides the secondary display device 220 with the information about the possible scoring scenarios for display on the secondary display device 220. In some embodiments, the media application uses the relative position of the secondary display device 220 to determine which information to generate for display on the secondary display device 220.

Figure 3:
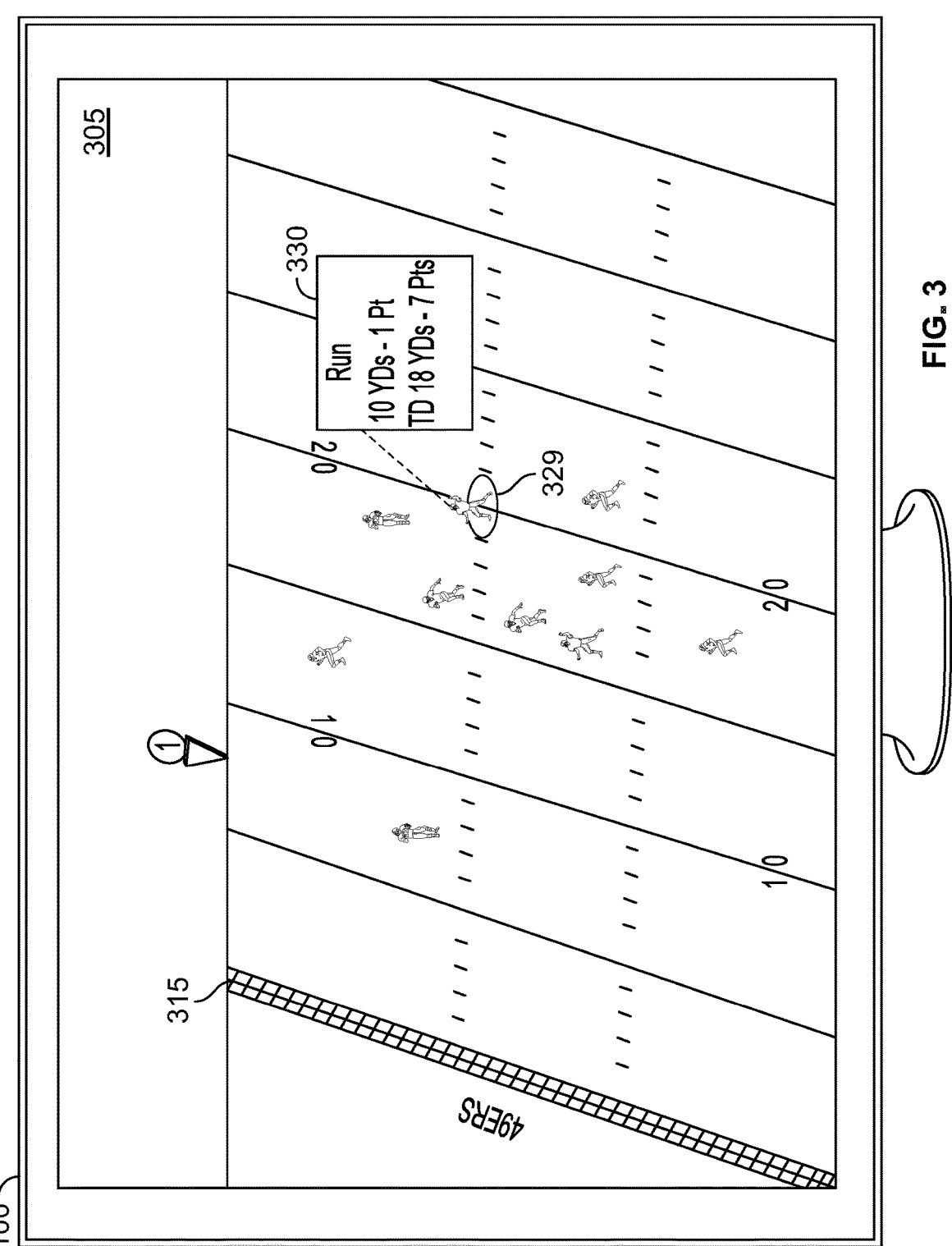
FIG. 3 depicts another illustrative embodiment of a display of fantasy sports scoring opportunities presented with video of a live sporting event in accordance with some embodiments of the disclosure.

FIG. 3 depicts another illustrative embodiment of a display of fantasy sports scoring opportunities presented with video of a live sporting event in accordance with some embodiments of the disclosure. Continuing with the example from FIG. 1, FIG. 3 depicts a video 205 of a live sporting event (e.g., an NFL football game between the 49ers and the Chargers). A media application may map coordinates in the video 305 of the live sporting event to the locations on the playing space of the live sporting event that correspond to the possible scoring scenarios. For example, the media application may identify the location of the San Francisco 49ers' goal line in the video 305 of the live sporting event (e.g., the xy-coordinates of the goal line). In some embodiments, the media application may determine a graphical overlay 315 for the mapped locations on the playing space of the live sporting event to indicate the corresponding possible scoring scenarios. For example, the media application may generate a red and gold line 315 over the goal line and a red and gold halo 329 around the user's running back on the playing surface. In some embodiments, the media application modifies the video of the live sporting event to include the graphical overlay. For example, the media application may overlay the graphical information and textual information 310 over the video of the sporting match. Thus, the media application may track active players from the user's fantasy sports roster in the video 305 and annotate the video 305 with information about scoring opportunities in the user's fantasy sports matchup that could be satisfied by actions of the identified players. In FIG. 3, for example, fantasy information overlay 310 indicates two scoring opportunities associated with the running back, a 10-yard run for 1 point and a 18-yard touchdown run for 7 points.

In some embodiments, the media application may track a playing object in the video 305 of the live sporting event. For example, an image recognition system in the media application may use the size, shape, or color of different playing objects such as a football or other object. The media application may determine that the current circumstances of the live sporting event are changed based on a current location of the playing object in comparison to a previous location of the playing object. For example, if the line of scrimmage was originally determined to be at the San Francisco 49ers' 45-yard line and the ball is tracked from the 45-yard line to the 30-yard line, then the media application may determine the circumstances of the live sporting event have changed. In some embodiments, the media application may apply the set of rules to data representing the changed circumstance of the live sporting event to identify updated scoring scenarios in the fantasy sports event and generate for display, with the video of the live sporting event, information about the updated scoring scenarios.

Media applications may take various forms depending on the content for which they provide guidance. One typical type of media application is an interactive television program guide. Interactive television program guides (sometimes referred to as electronic program guides) are well-known guidance applications that, among other things, allow users to navigate among and locate many types of content or media assets. Interactive media applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance and media applications may be available on these devices, as well. The guidance provided may be for content available only through a television, for content available only through one or more of other types of user equipment devices, or for content available both through a television and one or more of the other types of user equipment devices. The media applications may be provided as on-line applications (i.e., provided on a web-site), or as stand-alone applications or clients on user equipment devices. Various devices and platforms that may implement media applications are described in more detail below.

One of the functions of the media application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figures 4, 5:
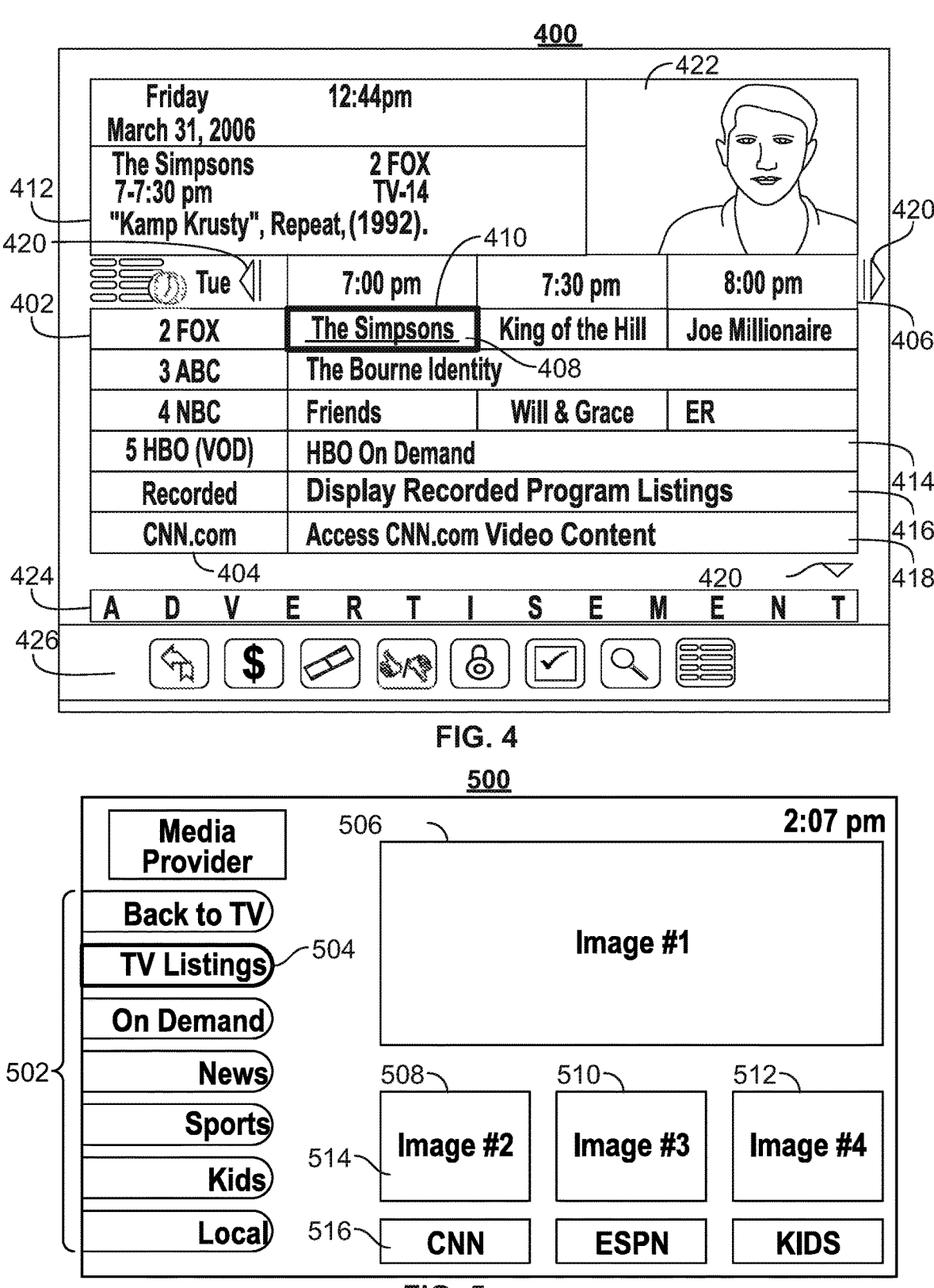
FIG. 4 shows an illustrative embodiment of a display screen that may be used to provide media application listings and other media guidance information, in accordance with some embodiments of the disclosure.
FIG. 5 shows another illustrative embodiment of a display screen that may be used to provide media application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media application display screens of the embodiments described herein.

Options region 426 may allow the user to access different types of content, media application displays, and/or media application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media application may be personalized based on a user's preferences. A personalized media application allows a user to customize displays and features to create a personalized "experience" with the media application. This personalized experience may be created by allowing a user to input these customizations and/or by the media application monitoring user activity to determine various user preferences. Users may access their personalized guidance application by logging in or otherwise identifying themselves to the guidance application. Customization of the media application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media application may allow a user to provide user profile information or may automatically compile user profile information. The media application may, for example, monitor the content the user accesses and/or other interactions the user may have with the guidance application. Additionally, the media application may obtain all or part of other user profiles that are related to a particular user (e.g., from other web sites on the Internet the user accesses, such as www.Tivo.com, from other media applications the user accesses, from other interactive applications the user accesses, from another user equipment device of the user, etc.), and/or obtain information about the user from other sources that the media application may access. As a result, a user can be provided with a unified guidance application experience across the user's different user equipment devices. This type of user experience is described in greater detail below in connection with FIG. 7. Additional personalized media application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
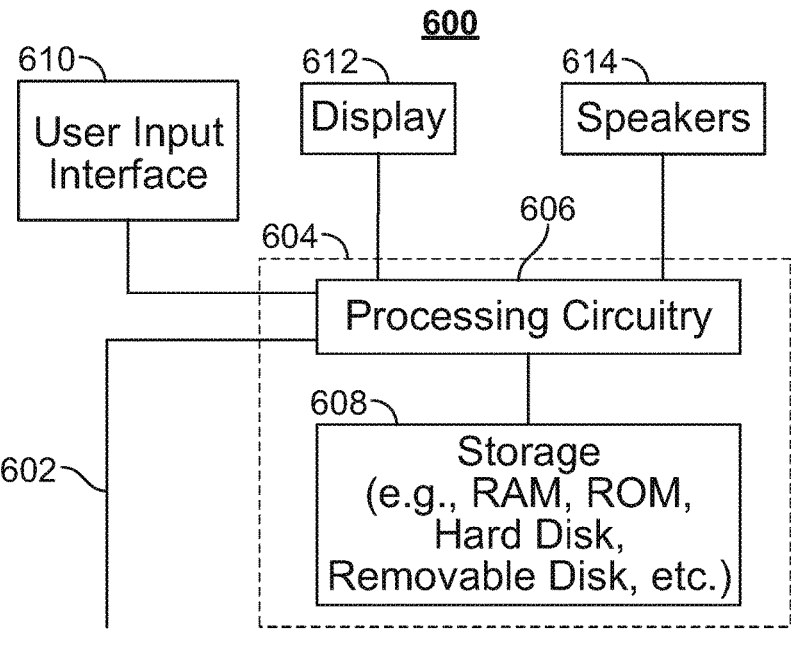
FIG. 6 is a block diagram of an illustrative user equipment (UE) device in accordance with some embodiments of the disclosure.

Users may access content and the media application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media application stored in memory (i.e., storage 608). Specifically, control circuitry 604 may be instructed by the media application to perform the functions discussed above and below. For example, the media application may provide instructions to control circuitry 604 to generate the media guidance displays. In some implementations, any action performed by control circuitry 604 may be based on instructions received from the media application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
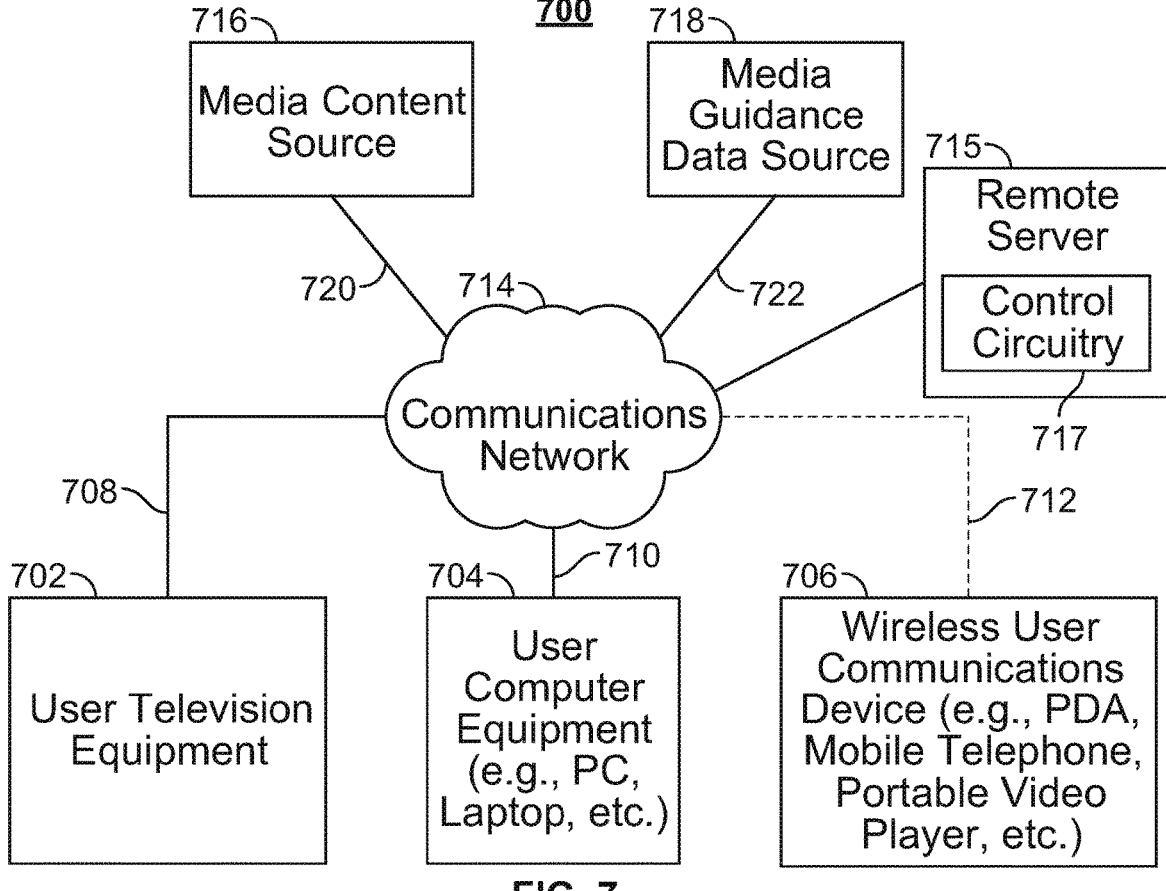
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media application itself or software updates for the media application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media application may generate promotions that entice the user to keep the particular service or source indicated by the score as one to which the user will likely terminate access.

Media applications may be, for example, stand-alone applications implemented on user equipment devices. For example, the media application may be implemented as software or a set of executable instructions which may be stored in storage 608, and executed by control circuitry 604 of a user equipment device 600. In some embodiments, media applications may be client-server applications where only a client application resides on the user equipment device, and server application resides on a remote server. For example, media applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media applications (e.g., web-based applications or cloud-based applications), or the content can be displayed by media applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media application implemented on a remote device. For example, users may access an online media application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 716 to access content. Specifically, within a home, users of user television equipment 702 and user computer equipment 704 may access the media application to navigate among and locate desirable content. Users may also access the media application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
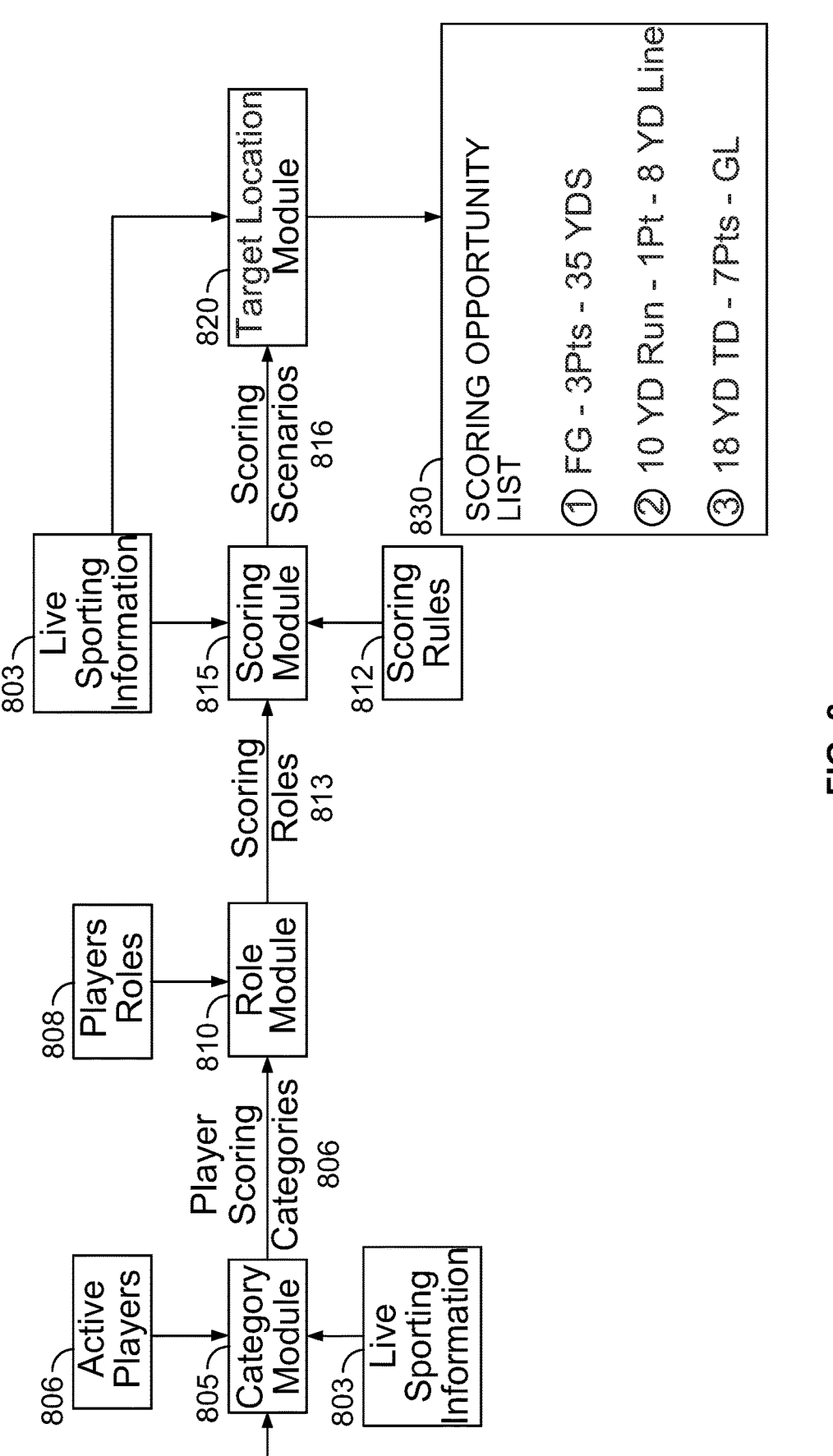
FIG. 8 depicts an illustrative rules engine for identifying scoring opportunities in a fantasy sports matchup in accordance with some embodiments of the disclosure.

FIG. 8 depicts an illustrative rules engine for identifying scoring opportunities in a fantasy sports matchup, in accordance with some embodiments of the disclosure. Rules engine 800 may be implemented by control circuitry 604 (e.g., in a manner instructed to control circuitry 604 by the media application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

A rules engine uses, for example, a set of data structures and modules to identify a user's scoring opportunities in a fantasy sports matchup that pertain to the given scenarios of a live sporting match. The generic nature of the rules engine allows the system to be customized for different scoring systems, different fantasy sports leagues, and different sports (e.g., football, baseball, soccer, hockey). Thus, while the examples are described with reference to a fantasy sports league based on NFL performances, the same teaching could be applied elsewhere. An exemplary set of data structures is illustrated in FIG. 9.

Figure 9:
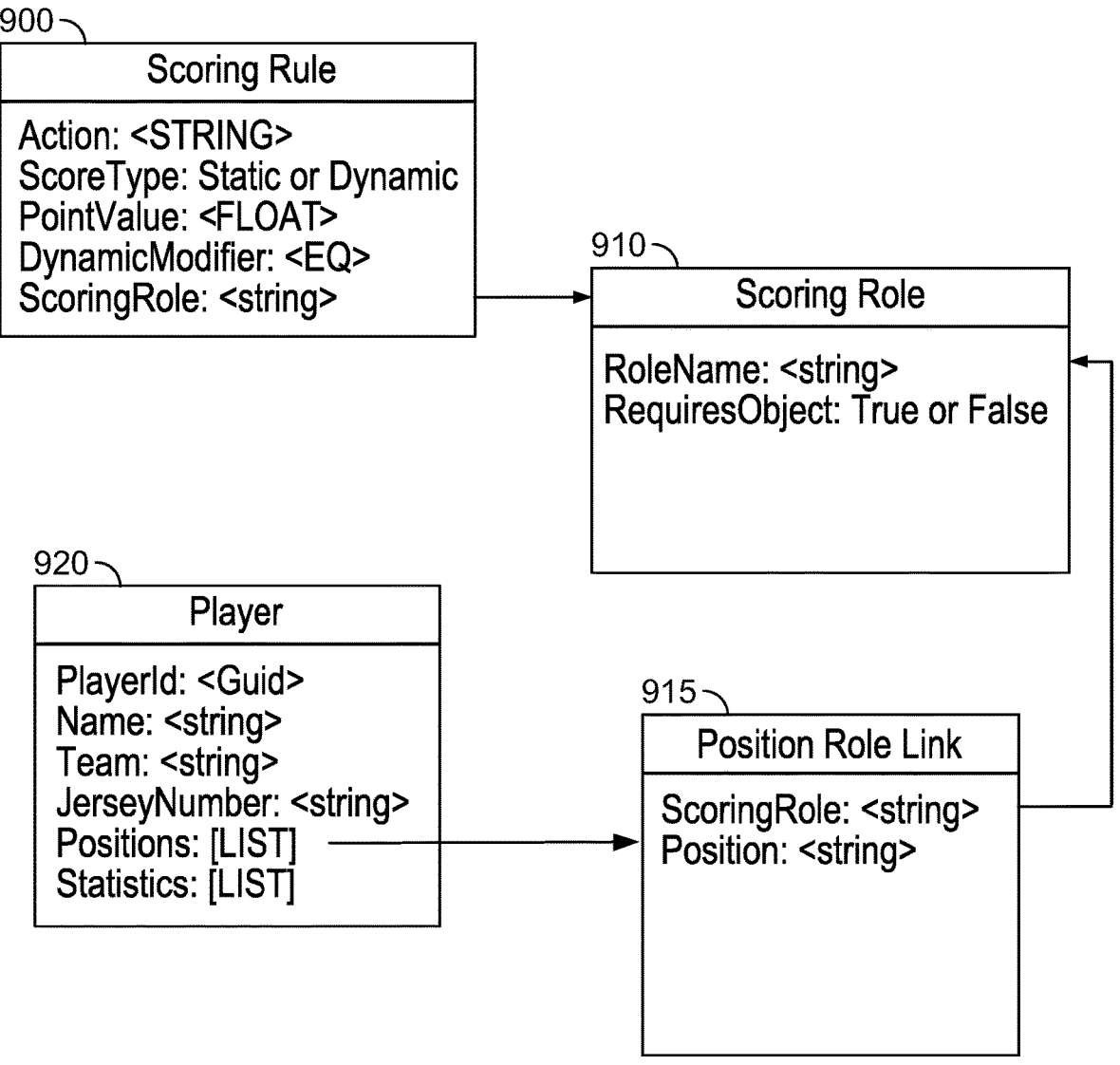
FIG. 9 depicts an illustrative set of data structures for defining a scoring system of a fantasy sports league in accordance with some embodiments of the disclosure.

FIG. 9 depicts an illustrative set of data structures for defining a scoring system of a fantasy sports league. The scoring system is made up of collections of scoring rules, scoring roles, position-scoring role links, and players.

A scoring rule data structure 900 comprises information that describes a rule within a fantasy sport's league that gives a user in that league fantasy points. For example, a fantasy league for the NFL may provide a user with 1 point for every 10 rushing yards a player. The scoring rule 900 includes, for example, the following fields: action; score_type; point_value; dynamic_modifier; and scoring_role. The action is a string value, e.g., "run ball," that provides a name for the rule. The score_type provides an indication of whether the score is static or dynamic (e.g., a fixed value or derived value). The point_value field stores a float that is the value of the score for that rule or serves as a portion of a dynamic scoring rule. The dynamic_modifier field stores an equation that is used to determine the final point value for a given action. For example, the dynamic_modifier field may store an equation that reads "point_value*yards/10" for a score rule that is a user receives 1 point for every 10 yards ran with the ball. The scoring_role is a string field that indicates a role associated with the scoring rule, e.g., "rushing."

The scoring_role string field in the scoring rule data structure 900 lines the scoring role with a scoring role as defined in scoring_role 910. For example, different scoring roles may exist under a given scoring system. In one example, a scoring system may have scoring roles of: "passing," "rushing," "miscellaneous," "kicking," and "defense." Each role may be associated with a field indicating a scoring category, such as whether the role requires possession of a playing object, i.e., offense or defense. The scoring roles are linked to positions using the position role link data structure 915 which comprises a "scoring_role" string linking to a scoring_role data structure and a "position_name" stored as a string. Using this link structure, multiple positions can be linked to the same scoring_role which is linked to multiple scoring rules. Thus, the same rules can be applied to similarly situated positions, e.g., running back, halfback, and fullback. The data structures of FIG. 9 also include a player data structure 920. The player structure 920 includes a player_id stored as, e.g., a globally unique identifier, a player name stored as a string, a team name stored as a string, a jersey number stored as a string or alternatively as a number, a list of positions the player is assigned, and, in some cases, a set of statistics related to the player's performance.

Rules engine 800 begins with category module 805. Using information about the current circumstances of a live sporting event, e.g., the teams in the live sporting event, the position of a playing object, the team with possession of the playing object, the time remaining in the live sporting event, the athletes on the playing surface, etc., the category module 805 determines scoring categories associated with active players from a user's fantasy roster. For example, a media application using control circuitry 604 implements the rule engine 800 and uses information that indicates which team has possession of the playing object 803 (e.g., which team has possession of a football), along with a list of the users' active players 804 in the live sporting event, to extract a set of player scoring categories 806 for each active player. For example, the rules engine 800 may use data structures as described in FIG. 9 to retrieve a set of scoring categories for the active players.

Using the example from FIG. 1, if the user has the 49ers' running back and placekicker. then active players list 804 may comprise those players. Furthermore, the information about the live sporting event 803 may comprise an indicator that the 49ers are in possession of the football, i.e., the 49ers are on offense. In this example, category module 805 would identify offense as the scoring category for the user's running back and placekicker in the player scoring categories 806.

The player scoring categories 806 is used as input by the role module 810 along with a list of position role links 808 to determine a set of player scoring roles 813, i.e., a set of scoring roles associated with players on the user's roster. For example, in the example above, the user has two active players, a 49ers' running back and 49ers' placekicker. Running backs are associated by a position role link with a rushing role in an offensive playing category. Placekickers are associated by a position role link with a kicking role in an offensive playing category. Using the list of player scoring categories 806 for this example, the role module can locate a list of scoring roles 813 for the running back, e.g., "rushing," and for the placekicker, e.g., "kicking."

The scoring module 815 may use the information about the live sporting event 803, list of scoring roles 813, and list of scoring rules 814 to determine a list of scoring scenarios 816. For example, the scoring module 815 may determine, based on the 49ers having possession of the football on the 18-yard line, that the 49ers' running back has two scoring scenarios and the placekicker has one scoring opportunity. For example, the running back may have a 1-point scoring opportunity if the running back runs from the 18-yard line to at least the 8-yard line and may have a 7-point scoring opportunity if the running back runs 18 yards for a touchdown. Also, the rules engine 800 may determine the placekicker has a 3-point opportunity if he kicks a field goal (which would be for 35 yards under the NFL's criteria of adding 17 yards to the position of the ball for field goals). The scoring scenarios 816 may be output to a target location module 820 that identifies a location on the field of play that corresponds with each scoring scenario, e.g., the goal post for the field goal, the 8-yard line for the 1-point run, and the goal line for the 7-point run. The target location module 820 generates a list of scoring opportunities 830 with a notation of the location of interest on the playing surface.

In some embodiments, the rules engine 800 also takes into account whether a player is on the field of play when identifying the list of scoring opportunities. This can be achieved by several modules, such as the scoring module 815 which may inspect the information about the live sporting event 803 to determine whether a player is on the field of play and remove any scoring opportunities that are associated with players on the user's roster that are not on the active playing surface.

FIG. 10 depicts an illustrative set of scoring scenarios 1000 for a fantasy football scoring system. In FIG. 10, positions list 1010 includes eleven positions placed in a list of 5 scoring roles 1020. The set of scoring scenarios include a list of 21 scoring actions 1030 with corresponding point values 1040. The relationship between positions, scoring roles, scoring rules, and points is demonstrated by the set of scoring scenarios 1000. For example, the data structures that define a scoring rule for rushing per 10 yards is demonstrated in FIG. 11.

Figure 11:
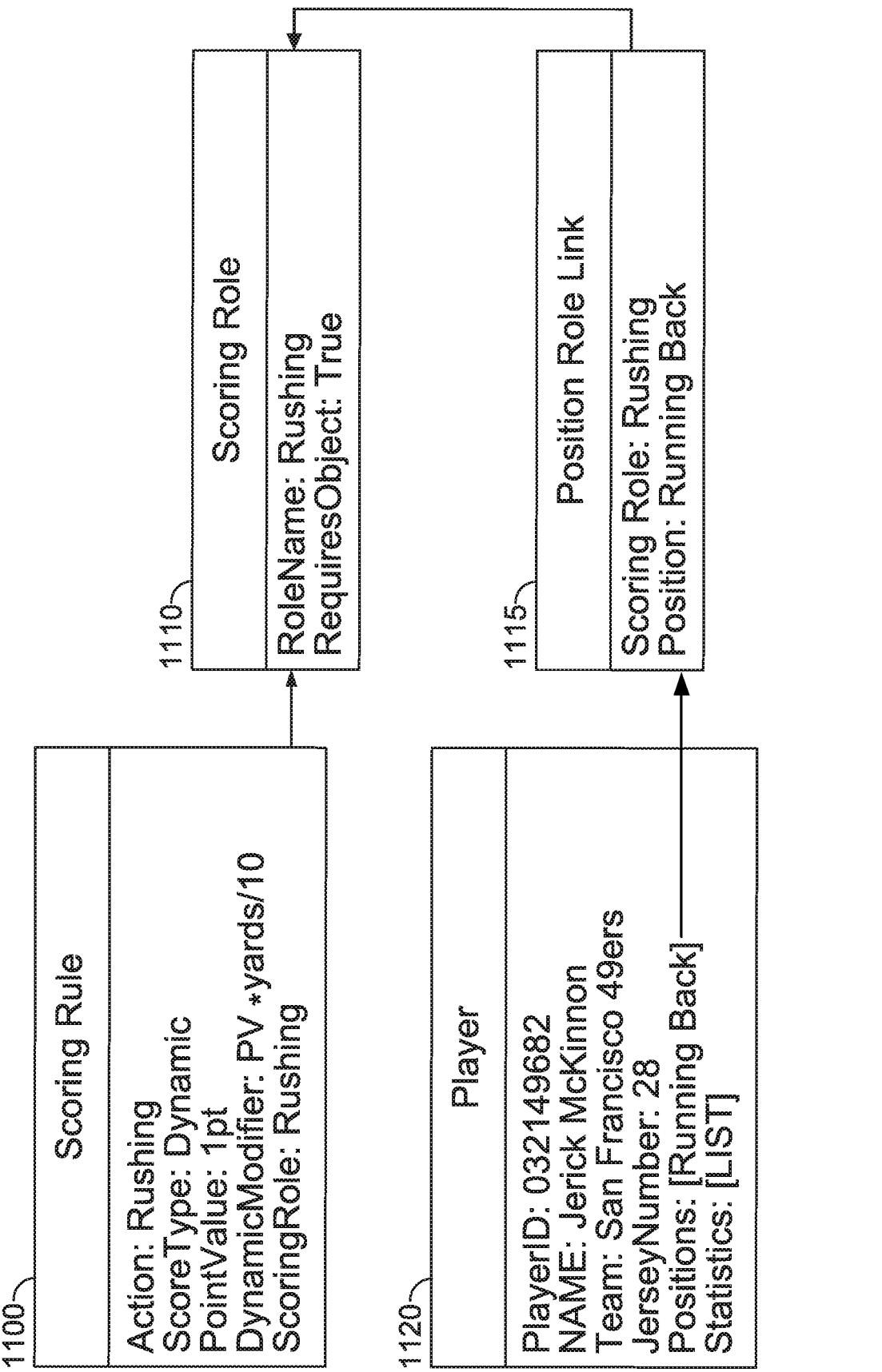
FIG. 11 depicts a set of data structures for defining a scoring rule for a running rule in a fantasy football scoring system in accordance with some embodiments of the disclosure.

FIG. 11 depicts a set of data structures for defining a scoring rule for a running rule in a fantasy football scoring system. In FIG. 11, a scoring rule 1100 defines a rule for the action "run ball" that is a "dynamic" score type. The point value for scoring rule 1100 is 1 point and is modified by the equation "point value*yards/10", i.e., the user receives 1 point for every ten yards when the ball is run by a player. The scoring role is "rushing." The scoring role 1110 defines the "rushing" role in a "offense" playing category. Position role link 1115 links the "running back" position to the "rushing" scoring role 1110. FIG. 11 also depicts a player data structure 1120 for player ID "032149682". Player 1120 is named "Jerick Mckinnon," plays for the "San Francisco 49ers," and wears jersey number 28. The player is listed as having one position: "running back." The player 1120 data structure may also include a list of statistics.

FIG. 12 is a flowchart of illustrative steps for generating a display of information about fantasy sports scoring opportunities in accordance with some embodiments of the disclosure. It should be noted that process 1200 or any step thereof could be performed on, or provided by, any of the devices shown in FIGS. 6-7. For example, process 1200 may be executed by control circuitry 604 (FIG. 6) as instructed by a media application implemented on user equipment 702 in order to present on-screen graphics. In addition, one or more steps of process 1200 may be incorporated into or combined with one or more steps of any other process or embodiment (e.g., process 1300 (FIG. 13)).

At step 1205, the control circuitry 604, using a media application, generates for display a video of a live sporting event. At step 1207, the control circuitry 604 retrieves, from a memory (e.g., storage 608 (FIG. 6) or media content source 716 (FIG. 7) or from a remote server 715), current status data of a fantasy sports event in which a user is participating. In some embodiments, the control circuitry 604 may instruct communication circuitry to retrieve the current status data from a remote source, e.g., a fantasy sports service provider such as DraftKings, Yahoo!, ESPN, or Fan Duel using a service API or by scraping web data. In some embodiments, the media application may inspect information provided by a media content source (e.g., content source 716 (FIG. 7)) to obtain the current status data and store that information in storage 608.

At step 1210, the control circuitry 604 identifies players from a roster maintained by the user for the fantasy sports event. In some embodiments, the control circuitry 604 may identify all players on a user's fantasy sports roster. In some embodiments, the media application may only identify the players that the user has set as active, for example in a fantasy sports scenario in which a user selects a subset of his full roster for the well. In some embodiments, the control circuitry 604 may identify only the players from the user's roster that are participating in the live sporting event. At step 1215, the control circuitry 604 obtains a set of rules, e.g., a set of rules defined according to data structures as described in FIG. 9, that define scoring opportunities in the fantasy sports event for the user as a function of possible actions and players in the sporting event. In some embodiments, the control circuitry 604 may use communication circuitry to obtain the rules from a remote server (e.g., remote server 715) that houses information about the fantasy sports matchup or league. In some embodiments, the user may define the rules in a user input interface 610 provided by a media application. At step 1220, the control circuitry 604 obtains data representing the current circumstances of the live sporting event. For example, the control circuitry 604 may obtain information about a football game from a remote server 715. In some embodiments, the control circuitry 604 may obtain information about the live sporting event from data transmitted along with the video of the sporting event from a content source (e.g., media content source 716).

At step 1225, the control circuitry 604 applies the set of rules to the data representing the current circumstances of the live sporting event to identify possible scoring scenarios in the fantasy sports event. For example, the control circuitry 604 may run the set of rules, such as rules 812, through a rules engine, e.g., engine 800 of FIG. 8. In some embodiments, the control circuitry 604 also identifies locations on a playing space of the live sporting event, e.g., an NFL football game, that correspond to the possible scoring scenarios. For example, the control circuitry 604 may determine that a field goal is associated with the field goal post, that a 10-yard run is associated with the 8-yard line, and that an 18-yard touchdown run is associated with the goal line.

At step 1230, the control circuitry 604 generates for display, with the video of the live sporting event, information about the possible scoring scenarios. For example, the control circuitry 604 may generate the fantasy sports information 120 (FIG. 1), fantasy sports information 225 (FIG. 2), or fantasy sports information 330 (FIG. 3). In some embodiments, the information may include identification of the locations on the playing space of the live sporting event that correspond to the possible scoring scenarios.

In some embodiments, process 1200 may continue at step 1245, where the control circuitry 604 determines whether a first scoring scenario in the possible scoring scenarios would change the winner of the fantasy sports event. For example, if the user is losing a fantasy sports matchup by 4 points, then a 5-point or greater swing would change the winner of the user's fantasy sports matchup. Using information about the current state of fantasy sports event, as described above, the control circuitry 604 may determine that one of the possible scoring opportunities can provide the points necessary to change the winner of the fantasy sports matchup. At step 1250, the control circuitry 604 may, in response to determining that the first scoring scenario would change who leads the fantasy sports event, emphasize the information about the first scoring scenario in comparison to information about other possible scoring scenarios. For example, the control circuitry 604 may, as illustrated in FIG. 1, place a highlighting box 126 around the 18-point scoring opportunity or may place an emphasis icon 127 near the scoring opportunity.

In some embodiments, process 1200 may include steps for displaying scoring opportunities associated with a second user. At step 1260, the control circuitry 604 may, using the techniques described above, identify a second set of possible scoring scenarios for a second user participating in the fantasy sports event. For example, a second user may be watching the video of the live sporting event with another user. The control circuitry 604 may present an interface (using, e.g., user input interface 610 and display 612) to the users to allow the users to identify themselves, including information sufficient for the media application to determine the fantasy sports roster associated with the user. In some embodiments, the control circuitry 604 may communicate with a user's personal device, e.g., a user's mobile phone or tablet, to retrieve information identifying the user. Once the users are identified, the control circuitry 604 may retrieve the rosters for the user and identify scoring opportunities in a fantasy sports league associated with each user. At step 1270, the control circuitry 604 may generate for display, with the video of the live sporting event, information about the second set of possible scoring scenarios, including identification associating the second set of possible scoring scenarios with the second user.

FIG. 13 is a flowchart of illustrative steps for mapping information about scoring opportunities onto video of a live sporting event in accordance with some embodiments of the disclosure. At step 1305, the control circuitry 604 maps coordinates in the video of the live sporting event to the locations on the playing space of the live sporting event that correspond to the possible scoring scenarios. For example, the control circuitry 604 may determine that the current status information of the live sporting event indicates the playing object is on the 18-yard line. Using, for example, an image recognition module, the control circuitry 604 may determine the x-y coordinates of the ball in the video, e.g., video 105, of the live sporting event. Further, the control circuitry 604 may use landmarks in the video of the live sporting event, e.g., the hash marks of a football field, to identify the position on the football field. In some embodiments, the control circuitry 604 may identify, for example, yardage markers in the video to orient the playing surface with the video of the playing surface. At step 1310, the control circuitry 604 determines a graphical overlay for the mapped locations on the playing space of the live sporting event to indicate the corresponding possible scoring scenarios. For example, the control circuitry 604 may determine a graphical overlay 315 (FIG. 3) to display over a portion of the playing field on the video of the live sporting event. In step 1315, the control circuitry 604 modifies the video of the live sporting event to include the graphical overlay.

FIG. 14 is a flowchart of illustrative steps for emphasizing a player on a user's fantasy sports roster in video of a live sporting event in accordance with some embodiments of the disclosure. At step 1405, the control circuitry 604 may determine a final player from the roster maintained by the user for the fantasy sports event, wherein there are no other players on the roster that can impact who leads the fantasy sports event. At step 1410, the control circuitry 604 tracks when the final player is active on the playing space of the live sporting event. At step 1415, the control circuitry 604 emphasizes the final player in the video of the live sporting event as compared with other participants of the live sporting event.

Figure 15:
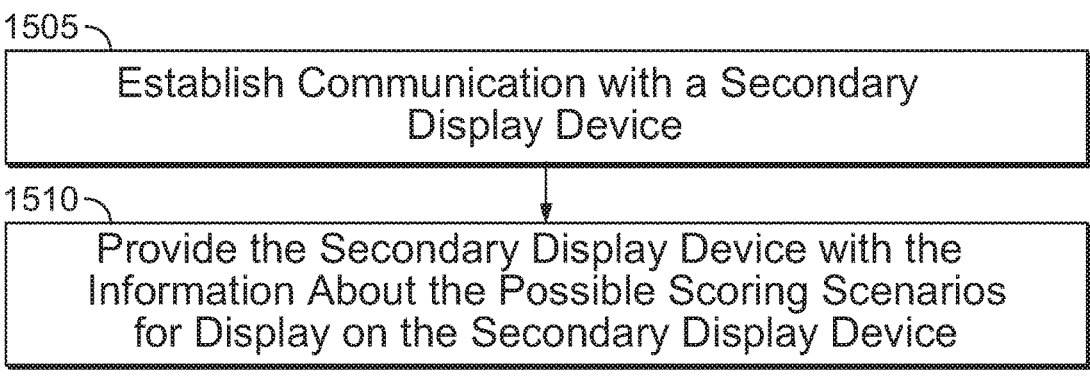
FIG. 15 is a flowchart of illustrative steps for providing a secondary display device with information about scoring opportunities in a fantasy sporting event in accordance with some embodiments of the disclosure.

FIG. 15 is a flowchart of illustrative steps for providing a secondary display device with information about scoring opportunities in a fantasy sporting event in accordance with some embodiments of the disclosure. At step 1505, the control circuitry 604 may establish communication, using, e.g., communication circuitry, with a secondary display device, e.g., goggles 220. At step 1510, the control circuitry 104 may provide the secondary display device with the information about the possible scoring scenarios for display on the secondary display device.

Figure 16:
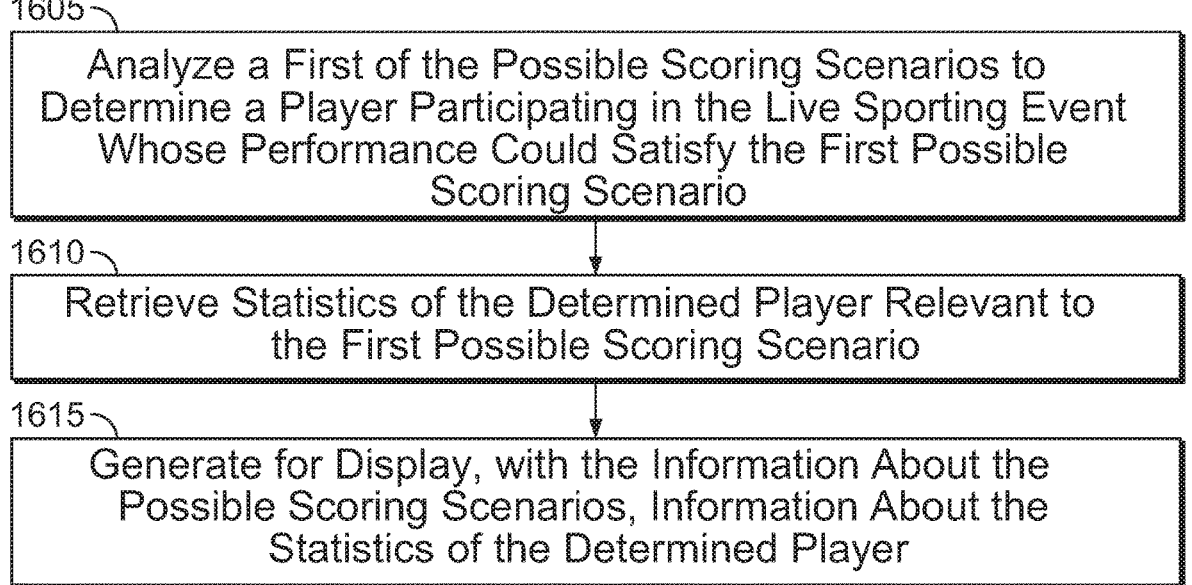
FIG. 16 is a flowchart of illustrative steps for displaying information about statistics of a player on a user's fantasy sports roster related to a scoring opportunity that the player could satisfy in accordance with some embodiments of the disclosure.

FIG. 16 is a flowchart of illustrative steps for displaying information about statistics of a player on a user's fantasy sports roster related to a scoring opportunity that the player could satisfy. At step 1605, the control circuitry 604 analyzes a first of the possible scoring scenarios to determine a player participating in the live sporting event whose performance could satisfy the first possible scoring scenario. At step 1610, the control circuitry 604 may retrieve statistics of the determined player relevant to the first possible scoring scenario. At step 1615, the control circuitry 604 generates for display, with the information about the possible scoring scenarios, information about the statistics of the determined player.

FIG. 17 is a flowchart of illustrative steps for emphasizing a selected player in a video of a live sporting event. At step 1705, the control circuitry 604 receives a selection of a possible scoring scenario from a user. At step 1710, the control circuitry 604 analyzes the selected possible scoring scenarios to determine a player participating in the live sporting event whose performance could satisfy the first possible scoring scenario. At step 1715, the control circuitry 604, in the video of the live sporting event, emphasizes the determined player.

FIG. 18 is a flowchart of illustrative steps for updating the scoring opportunities based on changed circumstances in a live sporting event. At step 1805, the control circuitry 604 tracks a playing object in the video of the live sporting event. At step 1810, the control circuitry 604 determines that the current circumstances of the live sporting event are changed, based on a current location of the playing object in comparison to a previous location of the playing object. At step 1815, the control circuitry 604 applies the set of rules to data representing the changed circumstance of the live sporting event to identify updated scoring scenarios in the fantasy sports event. At step 1820, the control circuitry 604 generates for display, with the video of the live sporting event, information about the updated scoring scenarios.

It is contemplated that the steps or descriptions of each of FIGS. 12-18 may be used with any other embodiment of this disclosure. In addition, the steps and descriptions described in relation to FIGS. 12-18 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-7 could be used to perform one or more of the steps in FIGS. 12-18.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 606 of FIG. 6. The processing circuitry, for instance, may be a general-purpose processor, a customized integrated circuit (e.g., an ASIC), or a field-programmable gate array (FPGA) within user equipment 702, media content source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment 100 stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention (s) of the instant disclosure, and does not form any admission as to what constitutes the state of the art.

It should also be noted that although some embodiments of this disclosure relate to the use of a media application to present information about scoring opportunities in a fantasy sports contest to a user, the media application may be used to present information about scoring opportunities related to other side-game contests outside the fantasy sports context. For example, in some embodiments, the media application may access a user profile to determine that a user may be involved in a side-game related to outcome of a horse race (e.g., having placed a wager on a trifecta) that is not associated with a fantasy sports team of a user. In some embodiments, users may be involved in side-games related to electronic sports, i.e., "eSports," events such as first person action or multiplayer online battle arena games.

What is claimed is:

1. A method comprising:
generating for display on a media device, a live sporting event;
  receiving, for a side-game associated with the displayed live sporting event, selection of a first play in the side-game, from a list of plays that are associated with possible scoring scenarios that affect the side-game;
  determining whether the first play would change who leads the side-game;
  in response to determining that the first play would change who leads the side-game, selecting a player for the side-game, from a plurality of players in the side-game, wherein the player is selected based on the player having performed the selected first play in another live sporting event; and
  updating the display of the live sporting event on the media device by emphasizing the selected player in the side-game and information about the first play in comparison to information about other possible plays.

2. The method of claim 1, further comprising:
obtaining statistics of a second player, from the from the plurality of players in the side-game;
determining, based on the obtained statistics, an average number of times the second player has historically performed the selected play in a live-sporting event;
determining for the displayed live-sporting event, that the second player has exceeded the average number of times the second player has historically performed the selected play; and
in response to determining for the displayed live-sporting event, that the second player has exceeded the average number of times the second player has historically performed the selected play, not emphasizing the second player as the player for the side-game.

3. The method of claim 1, wherein emphasizing the selected player comprises visually distinguishing the selected player from other players in the side-game.

4. The method of claim 1, wherein emphasizing the selected player includes placing a halo around the selected player, enlarging a video of the selected player, or highlighting the selected player.

5. The method of claim 1, further comprising, audibly announcing the selected player during the side-game.

6. The method of claim 1, further comprising:

obtaining data representing current circumstances of the live-sporting event; and applying a set of rules to the data representing the current circumstances of the live sporting event to identify possible scoring scenarios that affect the side-game.

7. The method of claim 1, wherein the selected player in the side-game is a player that is participating in the live-sporting event.

8. The method of claim 1, further comprising, overlaying a textual annotation relating to the possible scoring scenario on the display of the media device.

9. The method of claim 1, further comprising, displaying on a second media device, a counter-scoring scenario for an opponent of the user, wherein the counter-scoring scenario counters the selected play in the side-game.

10. A system comprising:

communications circuitry configured to access a database storing a list of plays that are associated with possible scoring scenarios that affect a side-game associate with a live sporting event; and control circuitry configured to:

generate for display on a media device, the live sporting event;

receive, for the side-game associated with the displayed live sporting event, selection of a first play in the side-game, from the list of plays that are associated with possible scoring scenarios that affect the side-game;

determine whether the first play would change who leads the side-game;

in response to determining that the first play would change who leads the side-game, select a player for the side-game, from a plurality of players in the side-game, wherein the player is selected based on the player having performed the selected first play in another live sporting event; and update the display of the live sporting event on the media device by emphasizing the selected player in the side-game and information about the first play in comparison to information about other possible plays.

11. The system of claim 10, further comprising, the control circuitry configured to:

obtain statistics of a second player, from the from the plurality of players in the side-game;

determine, based on the obtained statistics, an average number of times the second player has historically performed the selected play in a live-sporting event;

determine for the displayed live-sporting event, that the second player has exceeded the average number of times the second player has historically performed the selected play; and in response to determining for the displayed live-sporting event, that the second player has exceeded the average number of times the second player has historically performed the selected play, not emphasize the second player as the player for the side-game.

12. The system of claim 10, wherein emphasizing the selected player comprises the control circuitry configured to visually distinguish the selected player from other players in the side-game.

13. The system of claim 10, wherein emphasizing the selected player includes the control circuitry configured to place a halo around the selected player, enlarge a video of the selected player, or highlight the selected player.

14. The system of claim 10, further comprising, the control circuitry configured to audibly announce the selected player during the side-game.

15. The system of claim 10, further comprising, the control circuitry configured to:

obtain data representing current circumstances of the live-sporting event; and apply a set of rules to the data representing the current circumstances of the live sporting event to identify possible scoring scenarios that affect the side-game.

16. The system of claim 10, wherein the selected player in the side-game is a player that is participating in the live-sporting event.

17. The system of claim 10, further comprising, the control circuitry configured to overlay a textual annotation relating to the possible scoring scenario on the display of the media device.

18. The system of claim 10, further comprising, the control circuitry configured to display on a second media device, a counter-scoring scenario for an opponent of the user, wherein the counter-scoring scenario counters the selected play in the side-game.

\* \* \* \* \*